United States Patent
Klingler et al.

(10) Patent No.: US 7,826,618 B2
(45) Date of Patent: Nov. 2, 2010

(54) SYNCHRONIZATION OF ENCRYPTION IN A WIRELESS COMMUNICATION SYSTEM

(75) Inventors: Eric Klingler, Monroe, WA (US); Jeffrey Tedeschi, Woodinville, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 41 days.

(21) Appl. No.: 12/204,479

(22) Filed: Sep. 4, 2008

(65) Prior Publication Data

US 2009/0003604 A1 Jan. 1, 2009

Related U.S. Application Data

(62) Division of application No. 10/028,573, filed on Dec. 19, 2001, now Pat. No. 7,436,964.

(60) Provisional application No. 60/256,668, filed on Dec. 19, 2000.

(51) Int. Cl.
*H04L 9/00* (2006.01)
*H04K 1/00* (2006.01)
(52) U.S. Cl. .................. 380/274; 380/260; 380/271; 380/273
(58) Field of Classification Search ............ 380/260, 380/271, 273, 274
See application file for complete search history.

(56) References Cited

U.S. PATENT DOCUMENTS

| | | | | |
|---|---|---|---|---|
| 3,850,780 A | 11/1974 | Crawford et al. | ............ | 156/583 |
| 4,754,482 A | 6/1988 | Weiss | .......................... | 713/181 |
| 5,060,266 A | 10/1991 | Dent | .......................... | 380/274 |
| 5,081,679 A | 1/1992 | Dent | .......................... | 380/272 |
| 5,119,502 A | 6/1992 | Kallin et al. | ................. | 455/434 |
| 5,185,796 A | 2/1993 | Wilson | ....................... | 380/277 |
| 5,243,653 A | 9/1993 | Malek et al. | ................. | 380/272 |
| 5,278,907 A | 1/1994 | Snyder et al. | ............... | 380/274 |
| 5,307,370 A | 4/1994 | Eness | .......................... | 375/135 |
| 5,345,508 A | 9/1994 | Lynn et al. | ..................... | 380/46 |
| 5,528,693 A | 6/1996 | Leopold | ...................... | 380/274 |
| 5,613,203 A | 3/1997 | Dupuy et al. | ............... | 455/436 |
| 5,642,421 A | 6/1997 | Gray et al. | ................... | 713/160 |
| 5,717,689 A | 2/1998 | Ayanoglu | .................... | 370/349 |

(Continued)

OTHER PUBLICATIONS

Scheiner, Bruce, *Applied Cryptography, Protocols, Algorithms, and Source Code in C*, 1996, pp. 397-398, John Wiley and Sons, Inc., Second Edition U.S.

*Primary Examiner*—Michael Pyzocha
(74) *Attorney, Agent, or Firm*—Woodcock Washburn LLP

(57) ABSTRACT

Disclosed embodiments include a method for synchronizing a cryptosystem. In one embodiment, the method uses existing control data that is transmitted as part of a connection establishment process in a wireless communication system. In one embodiment, messages that are normally sent between a base station and a remote unit during the setup of both originating and terminating calls are parsed to detect a particular control message that indicates the start of telephony data transmission. Detection of this message indicates a point at which encryption/decryption can begin, and is used to synchronize the cryptosystem. Synchronizing a cryptosystem involves generating an RC4 state space in a keyed-autokey ("KEK") encryption system. In one embodiment, Lower Medium Access Channel ("LMAC") messages are used according to a wireless communication protocol. This is convenient because the LMAC messages are passed through the same Associated Control Channel ("ACC") processing that encrypts and decrypts the telephony data.

20 Claims, 20 Drawing Sheets

U.S. PATENT DOCUMENTS

| | | | |
|---|---|---|---|
| 5,778,075 A * | 7/1998 | Haartsen | 380/272 |
| 5,825,889 A | 10/1998 | Dent | 380/270 |
| 5,844,885 A | 12/1998 | Grob et al. | 370/216 |
| 5,889,781 A | 3/1999 | Eftimakis et al. | 370/509 |
| 5,930,359 A | 7/1999 | Kempke et al. | 713/160 |
| 5,943,425 A | 8/1999 | Mizikovsky | 380/247 |
| 5,989,559 A | 11/1999 | Edwards | 424/777 |
| 5,991,410 A | 11/1999 | Albert et al. | 705/78 |
| 6,266,418 B1 * | 7/2001 | Carter et al. | 380/257 |
| 6,272,632 B1 | 8/2001 | Carman et al. | 713/168 |
| 6,324,288 B1 | 11/2001 | Hoffman | 380/249 |
| 6,366,779 B1 | 4/2002 | Bender et al. | 455/450 |
| 6,480,522 B1 | 11/2002 | Hoole et al. | 375/130 |
| 6,516,065 B1 * | 2/2003 | Joshi et al. | 380/270 |
| 6,775,270 B1 | 8/2004 | Rhodes et al. | 370/352 |
| 6,944,299 B1 * | 9/2005 | Mallela et al. | 380/262 |
| 7,436,964 B2 | 10/2008 | Klingler et al. | 380/274 |
| 2002/0067712 A1 * | 6/2002 | Bergkvist | 370/347 |
| 2002/0165972 A1 | 11/2002 | Chien et al. | 709/229 |

* cited by examiner

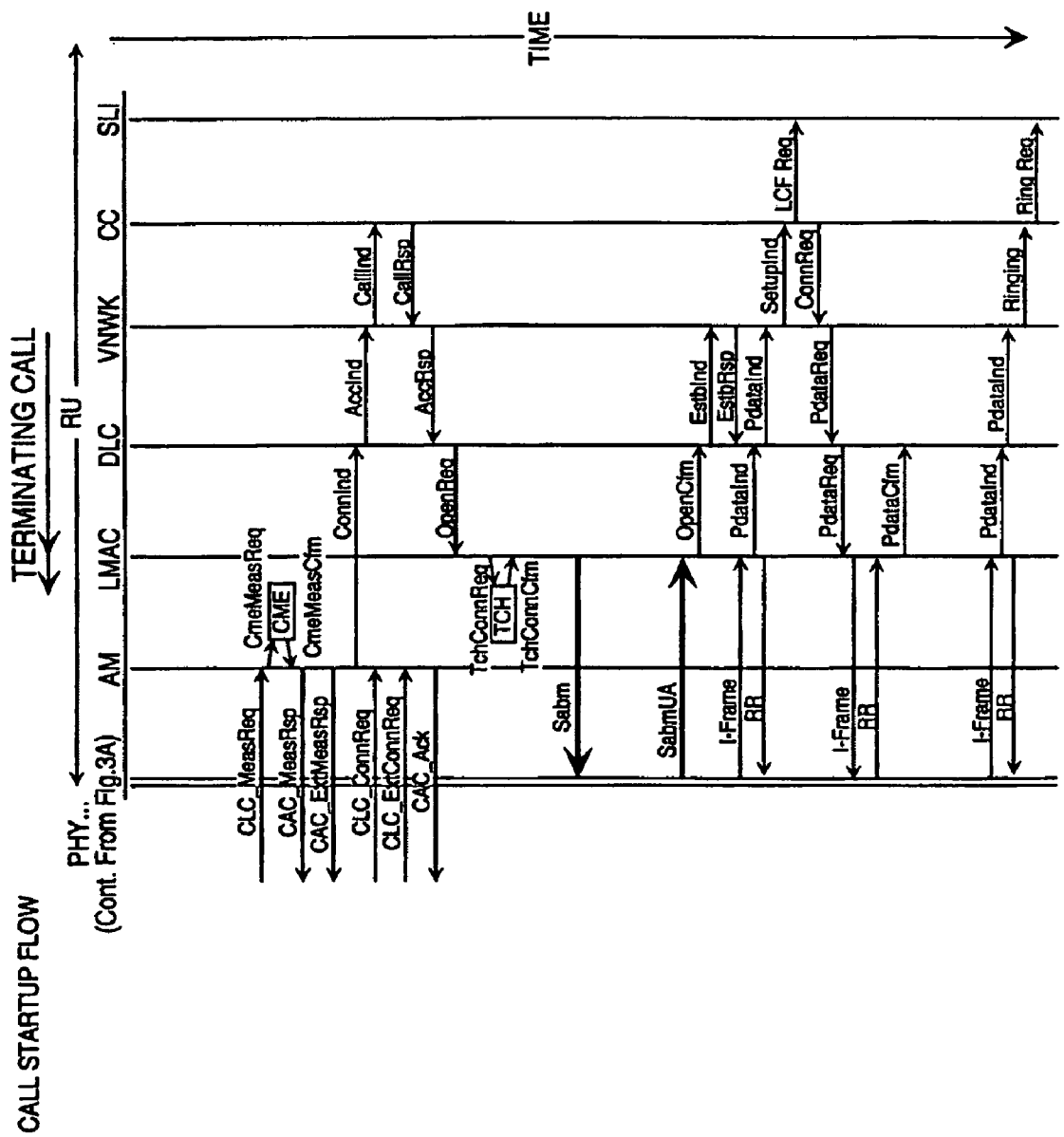

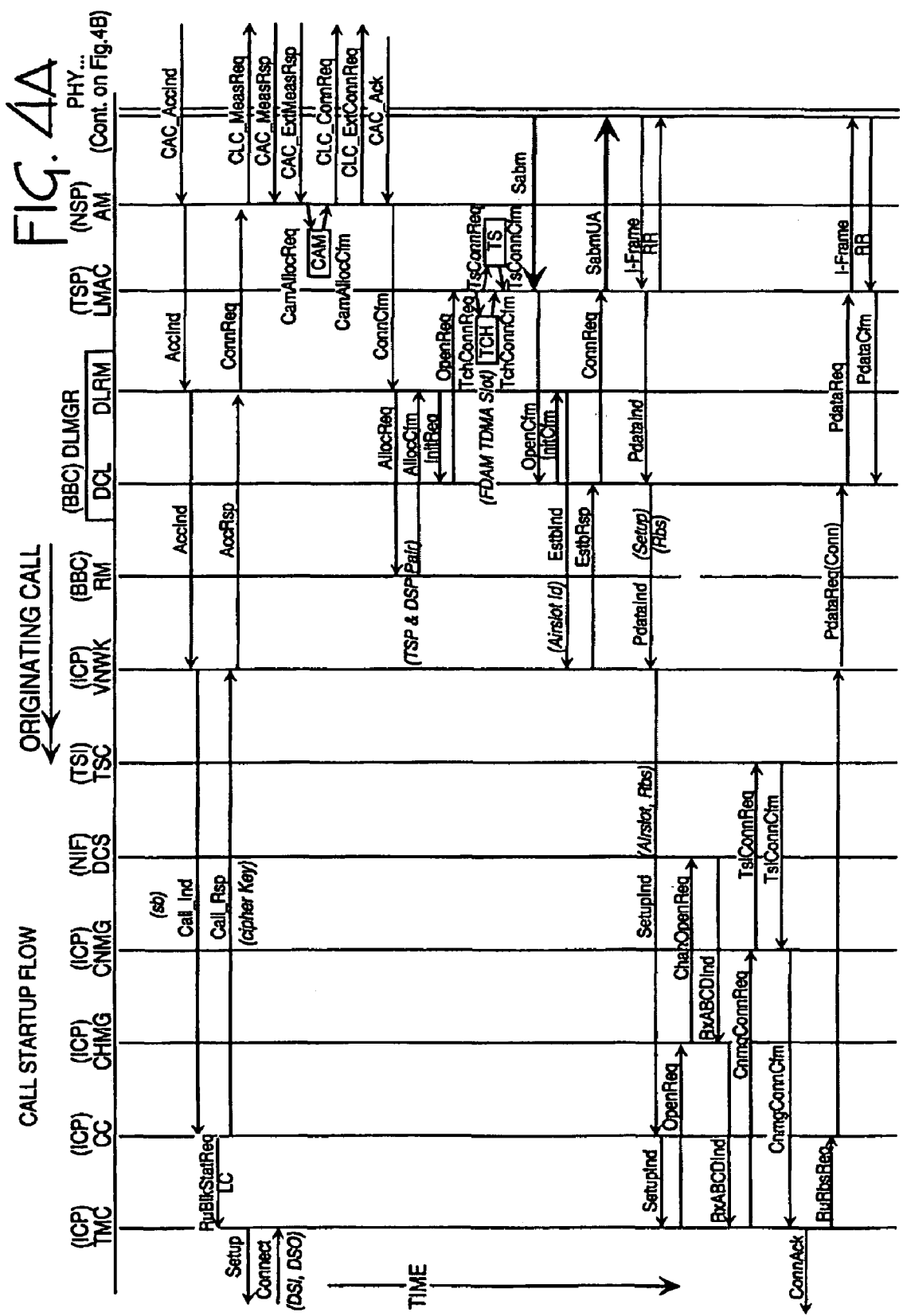

SYNCHRONIZATION OF ENCRYPTION IN A WIRELESS COMMUNICATION SYSTEM

CROSS-REFERENCE TO RELATED APPLICATION

This application is a divisional of U.S. application Ser. No. 10/028,573, filed on Dec. 19, 2001 which claims the benefit of U.S. Provisional Patent Application No. 60/256,668, filed Dec. 19, 2000, which is incorporated herein by reference in its entirety.

BACKGROUND

The disclosed embodiments relate to data transmission in wireless communications systems.

Data transmissions include telephony data and other data, such as control data. In typical wireless telecommunications environments, it is important to provide security for the telephony data transmitted on a radio frequency ("RF") channel between a wireless network subscriber's mobile unit and a fixed base. Secure communication allows users to be confident their communications are private and guarded from fraud.

Various techniques for securing telephony data transmitted over the RF channel include encrypting the telephony data for transmission over the RF channel. The telephony data is decrypted when received. Encryption techniques often employ a mathematical algorithm that alters or rearranges the telephony data using a key. A corresponding key must be used to decrypt the telephony data. Keys are usually changed periodically for security. One challenge for designers of such techniques is the need to synchronize the encryption mechanisms for equipment and/or software at the sending and receiving locations. Synchronization includes assuring that the sender and the receiver are using a current key, and the sender and receiver are encrypting and decrypting at an appropriate point in a transmission.

Synchronization must be established initially and maintained, even through situations in a wireless environment such as signal fading and handoff of an ongoing telephony call from one base station to another. Encryption synchronization in a wireless communication system can be difficult because the base station and remote unit are physically separated, and also because telephony calls (including low-speed modem calls and facsimile calls) are relatively asynchronous (e.g., no connection without an active call).

Prior approaches to encryption and synchronization have various disadvantages such as added signal processing overhead and time. For example, one technique used with a secure radiotelephone requires an additional infrared ("IR") link to establish and maintain encryption synchronization. Another method involving analog scrambling of the telephony data uses an additional sub-audible signal for continuous synchronization of the scrambled audio signal. One method for resynchronization of the encryption system after a handoff requires a processing delay that is in addition to any normal handoff delay Overall, there is a need for synchronization of encryption that avoids the above disadvantages while providing secure wireless communication.

Figure 1:
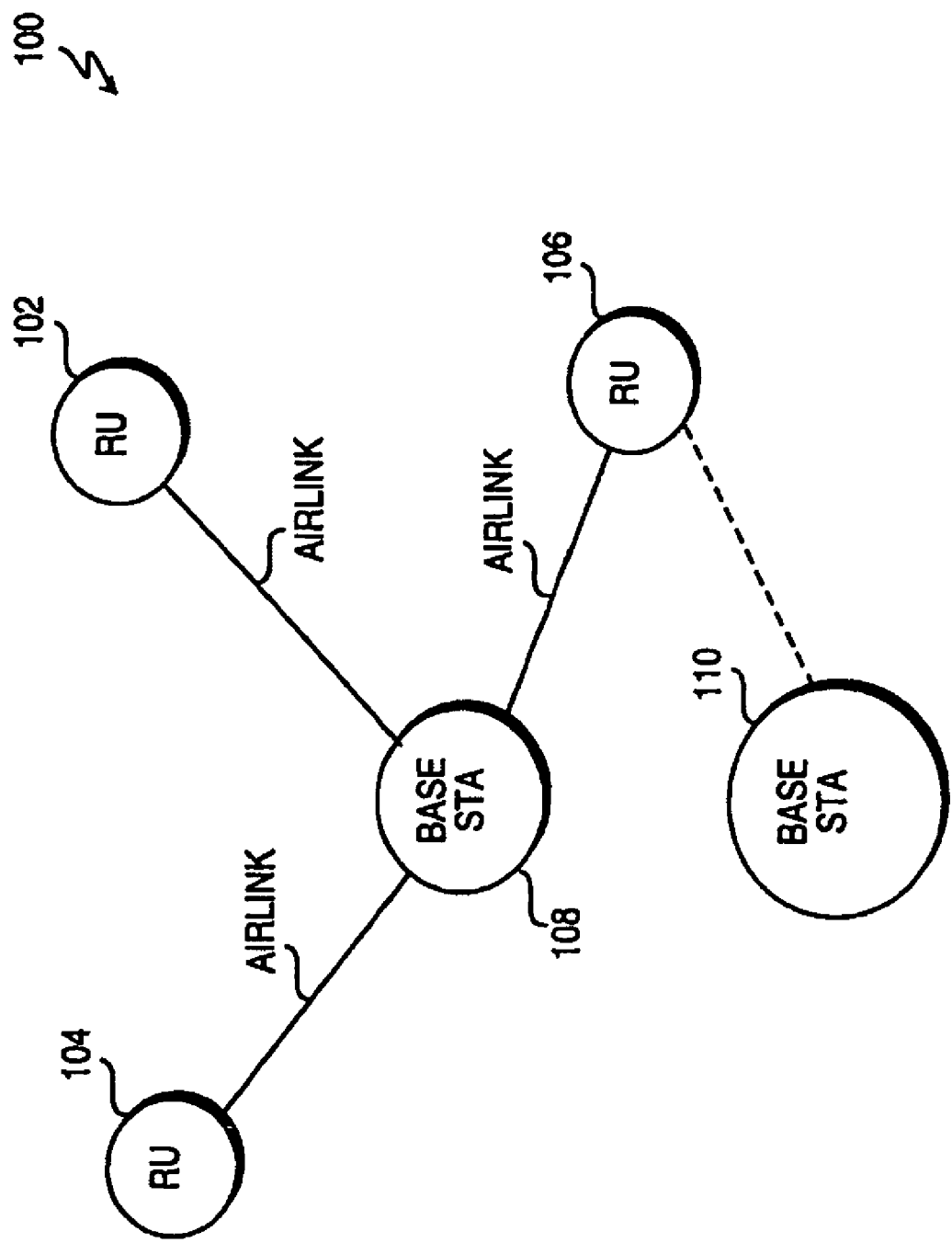
FIG. 1 is a block diagram of an embodiment of a telephony system that may employ an encryption method under one embodiment of the invention.

In the drawings, the same reference numbers identify identical or substantially similar elements or acts. To easily identify the discussion of any particular element or act, the most significant digit or digits in a reference number refer to the figure number in which that element is first introduced (e.g., element 204 is first introduced and discussed with respect to FIG. 2).

Note: the headings provided herein are for convenience and do not necessarily affect the scope or interpretation of the invention.

DETAILED DESCRIPTION

Embodiments of the invention, described below, use existing control data to synchronize a cryptosystem in a wireless communication system. In one embodiment, messages in a standard format that includes control data and payload data are processed, including determining whether the control data contains a particular control message. Messages normally sent between a base station and a remote unit during the setup of both originating and terminating calls are parsed to synchronize an evolving RC4 state space in a keyed-autokey ("KEK") encryption system. In one embodiment, Lower Medium Access Channel ("LMAC") messages are used according to a wireless communication protocol. This is convenient because the LMAC messages are passed through the same Associated Control Channel ("ACC") processing that encrypts and decrypts the telephony data. This is also effective because the particular LMAC messages used are sent each time connection establishment occurs. Once a data connection has been established, each side must know when to start encrypting and decrypting the bit stream. One embodiment includes software that detects a particular LMAC message that is always sent before completing a connection establishment process and just before the transmission of telephony data. This is also the point at which it is desirable to begin encryption synchronization. The LMAC message serves as a trigger that initiates an encryption synchronization process, including starting an encryption synchronization counter that operates to determine the point in the transmission at which encryption synchronization should begin. The particular LMAC messages are sent or resent each time a connection must be established. Thus, encryption is automatically resynchronized for any call initiation or interruption without additional layers of software or hardware.

FIG. 1 is a block diagram of an embodiment of a telephony system 100. The telephony system 100 includes remote units ("RUs") 102, 104, and 106, and base stations 108 and 110. The number of base stations and RUs is exemplary, and could vary in any particular instance. The RUs 102, 104, and 106, and the base stations 108 and 110 each contain various electronic circuitry to process control and data signals, such as digital signal processors ("DSPs"). The base stations 108 and 110, and in some embodiments the RUs 102, 104, and 106, further contain a central processing unit (CPU) and one or more memory devices for storing data including software routines executed by the CPU.

Any of the RUs can establish a telephony data connection with another RU in the system 100 or out of the system 100 through one of the base stations, such as base stations 108 or 110. An RU typically establishes a telephony connection with a base station in closest proximity. During a call, the call may be "handed off" from one base station to another. For example, RUs 104 and 102 preferably establish telephony connections with the base station 108. The RU 106 preferably establishes a telephony connection with the base station 108, but the call that is establishes could be handed off to the base station 110.

Figure 2:
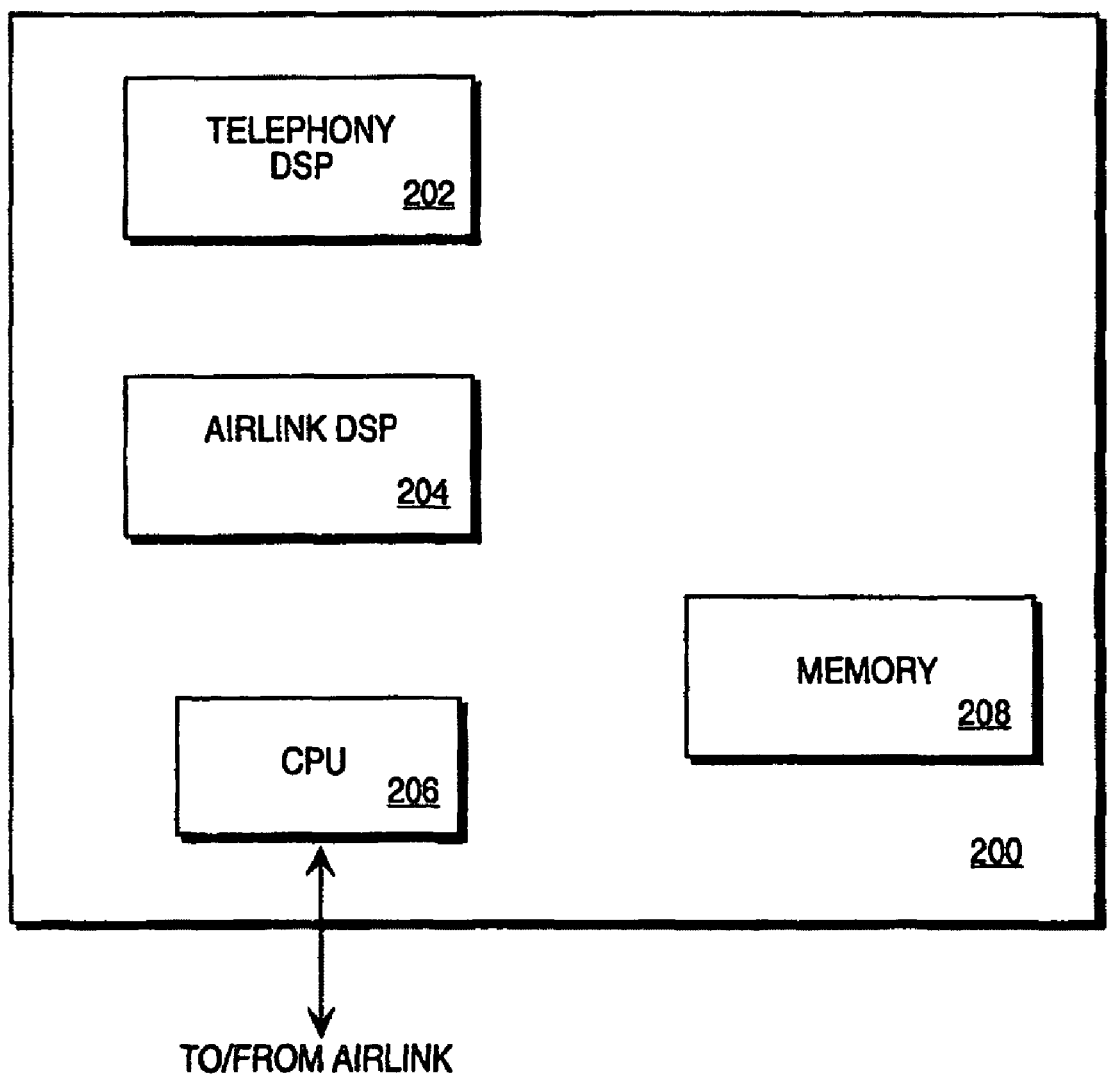
FIG. 2 is a block diagram of an embodiment of a base station.

FIG. 2 is a block diagram of an embodiment of a base station 200. The base station 200 includes a telephony DSP 202, an airlink DSP 204, a CPU, 206, and a memory device 208. The memory device 208 stores instructions and data, including in one embodiment, instructions for synchronizing encryption. In other embodiments, the instructions for synchronizing encryption are stored in other memory devices, or accessed via a network. As further explained herein, embodiments of the software instructions for synchronizing encryption include a master encryption switch that is active when encryption is to be performed. Embodiments of the software instructions for synchronizing encryption further include an encryption synchronization counter that is loaded with the size of a standard message being sent so that the end of the transmission and the point at which encryption should start can be determined.

The telephony data exchange involves multiple layers of software and hardware. For example, at a physical layer, the telephony data and other data, such as control data, is processed by an airlink digital signal processor ("DSP") for transmission over an established airlink. In one embodiment, encryption of telephony data is performed by a telephony DSP. The encryption as well as the synchronization of encryption is handled at an associated control channel ("ACC") software layer. As described in more detail below, existing ACC messages are parsed to provide encryption synchronization in the normal course of connection establishment.

Figure 3A:
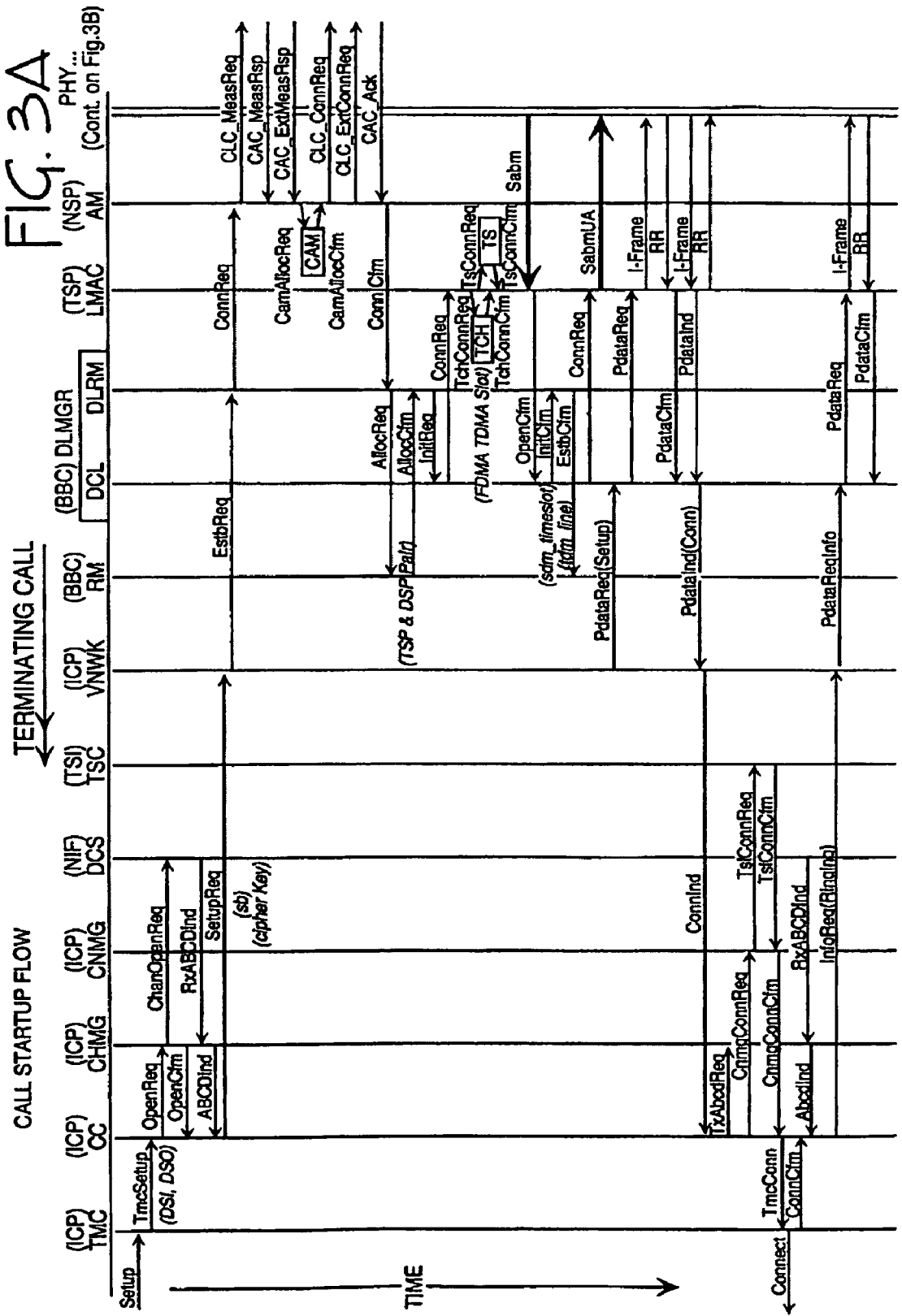
FIG. 3 is a block diagram of a message flow for connection establishment for a terminating call in one embodiment.
Figure 4B:
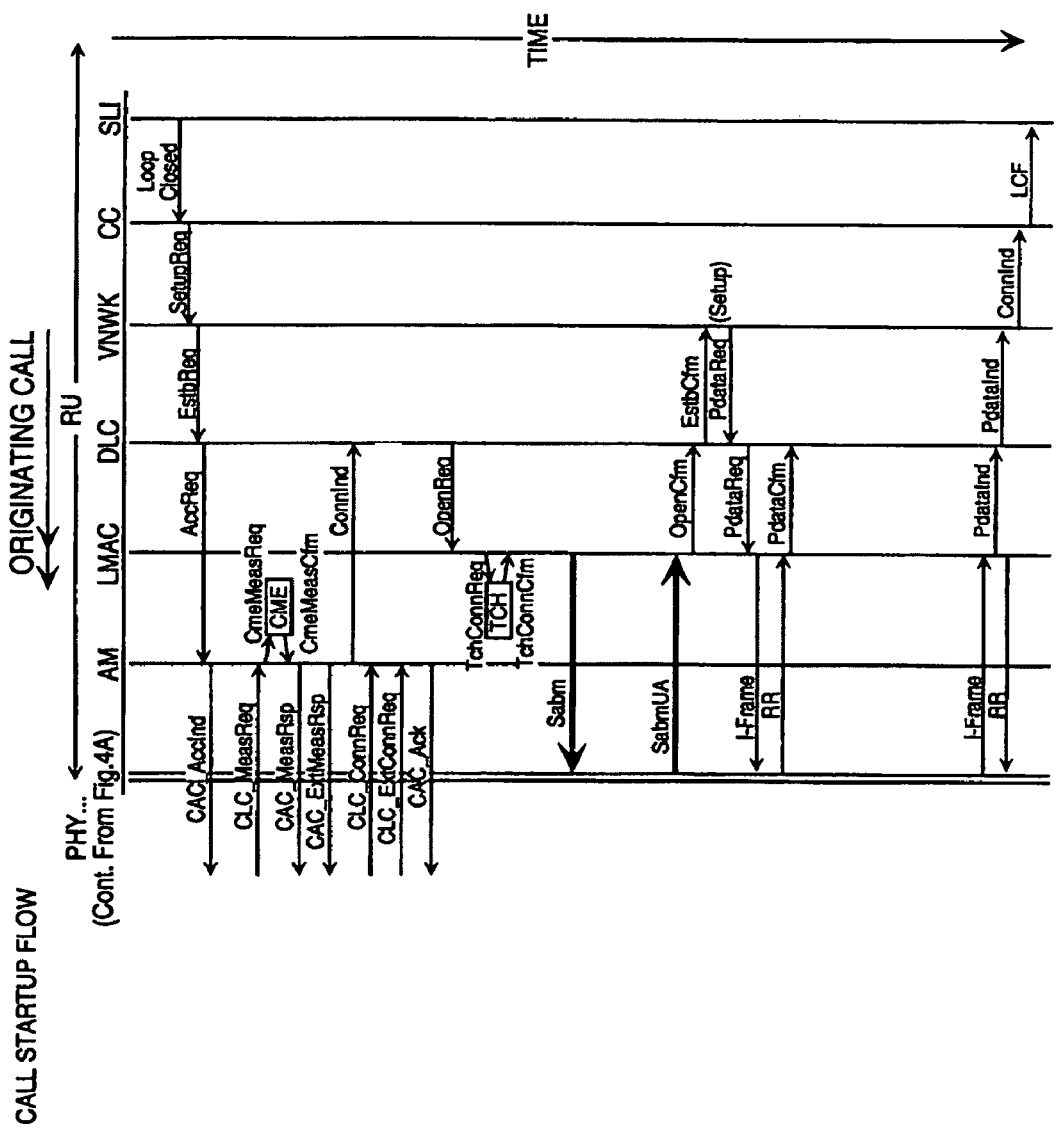
FIG. 4 is a block diagram of a message flow for connection establishment for an originating call in one embodiment.

FIGS. 3 and 4 illustrate a message flow in one embodiment for connection establishment for a terminating call and an originating call, respectively. A terminating call is a call in which the RU is the receiver, while the RU is the initiator of an originating call. Referring to FIGS. 3 and 4, the respective diagrams each list system layers across the top of the diagram, with base station layers on the left and RU layers on the right. The base station layers and RU layers meet at the physical layer, PHY, as shown. The labeled arrows each represent a message and its direction, that is from base station to RU, or vice versa. The sequence in which the messages occur is illustrated by time advancing from top to bottom in the diagrams.

During the establishment of a telephony connection, before voice data is being transmitted, it is not necessary to encrypt or decrypt data for security. In any case, if encryption mechanisms are not first synchronized between sender and receiver, the voice data may be unintelligible. Therefore, in one embodiment, a place in the message flow is identified that is common to all telephone calls after the DSP initiates a traffic channel, but before any telephony data exchange. As shown in FIGS. 3 and 4, both terminating and originating calls use the "set asynchronous balance mode" ("SABM") and "set asynchronous balance mode unnumbered acknowledge" ("SABMUA") messages in their setup. Moreover, the direction of a SABM message is always from RU to base station, while the direction of a SABMUA message is always from base station to RU. In addition, these are LMAC messages that are passed through the ACC processing on the DSP. In one embodiment, it is the ACC processing that encrypts and decrypts the telephony data using the RC4 methodology. Thus, it is convenient to place the mechanism for cryptosystem synchronization at this level of processing. The RC4 methodology is a known encryption/decryption methodology developed by Ron Rivest, and will be explained further below.

The nature of typical telephony communication (which includes voice data, low-speed modem data, and fax data) is such that data exchange according to a protocol is always occurring after call establishment, even if no telephony data is being exchanged. This characteristic is used advantageously in keeping the cryptosystem synchronized. There is a chance, in deep fading environments, for a telephony channel to be completely lost. This requires the RU and base station to reestablish a telephony data channel. During the channel reestablishment, transfers of SABM and SABMUA messages occur. The term "SABM/SABMUA message" will be used to indicate a message that is either a SABM message or a SABMUA message. Because the original SABM/SABMUA messages were used in the original cryptosystem synchronization, it is advantageous to use the SABM/SABMUA messages for resynchronizing the cryptosystem in the case of a reestablishment of a telephony data channel.

The ACC and its message types will now be briefly discussed only to the extent necessary to explain their role in embodiments of encryption synchronization. In one embodiment, an ACC message encompasses three message types, which are link control channel ("LCC") messages, telephony control channel ("TCC") messages, and physical control channel ("PCC") messages. An airlink DSP in a base station acts as a router. The LCC's client is a control CPU in the base station. The TCC's client is a telephony DSP in the base station, and the PCC's client is a physical management software entity.

Figure 5:
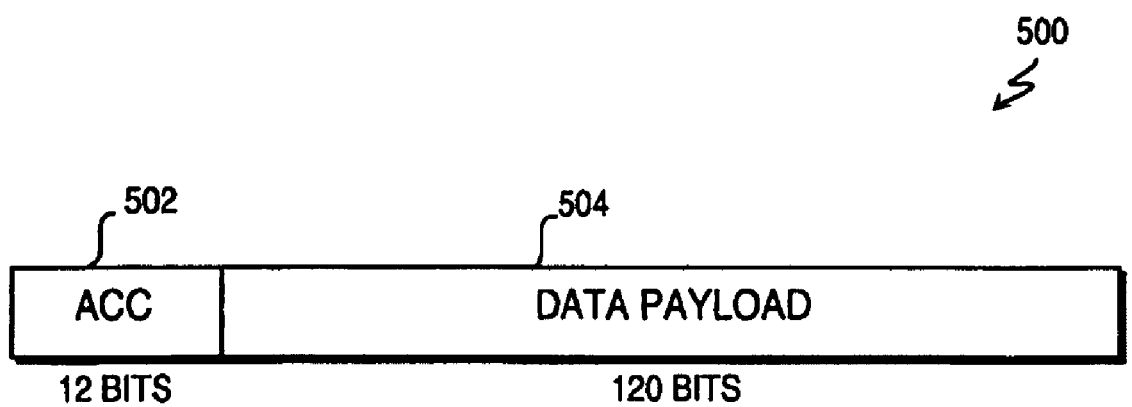
FIG. 5 is a diagram of an ACC/traffic channel frame in one embodiment.

FIG. 5 is a diagram of an ACC/traffic channel frame 500. The ACC/traffic channel frame 500 consists of 132 bits. Twelve bits are ACC bits 502, and 120 bits are data payload bits 504. The ACC bits 502 are an ACC message that is limited to twelve bits per frame. If an ACC message is longer than twelve bits, additional frames are used to transmit the ACC message. In one embodiment, the frame rate for the traffic channel frame 500 is 7.5 ms/frame. Therefore, the amount of time it takes a normal message to complete is equal to the size of the message in bytes times 7.5 ms.

Figure 6:
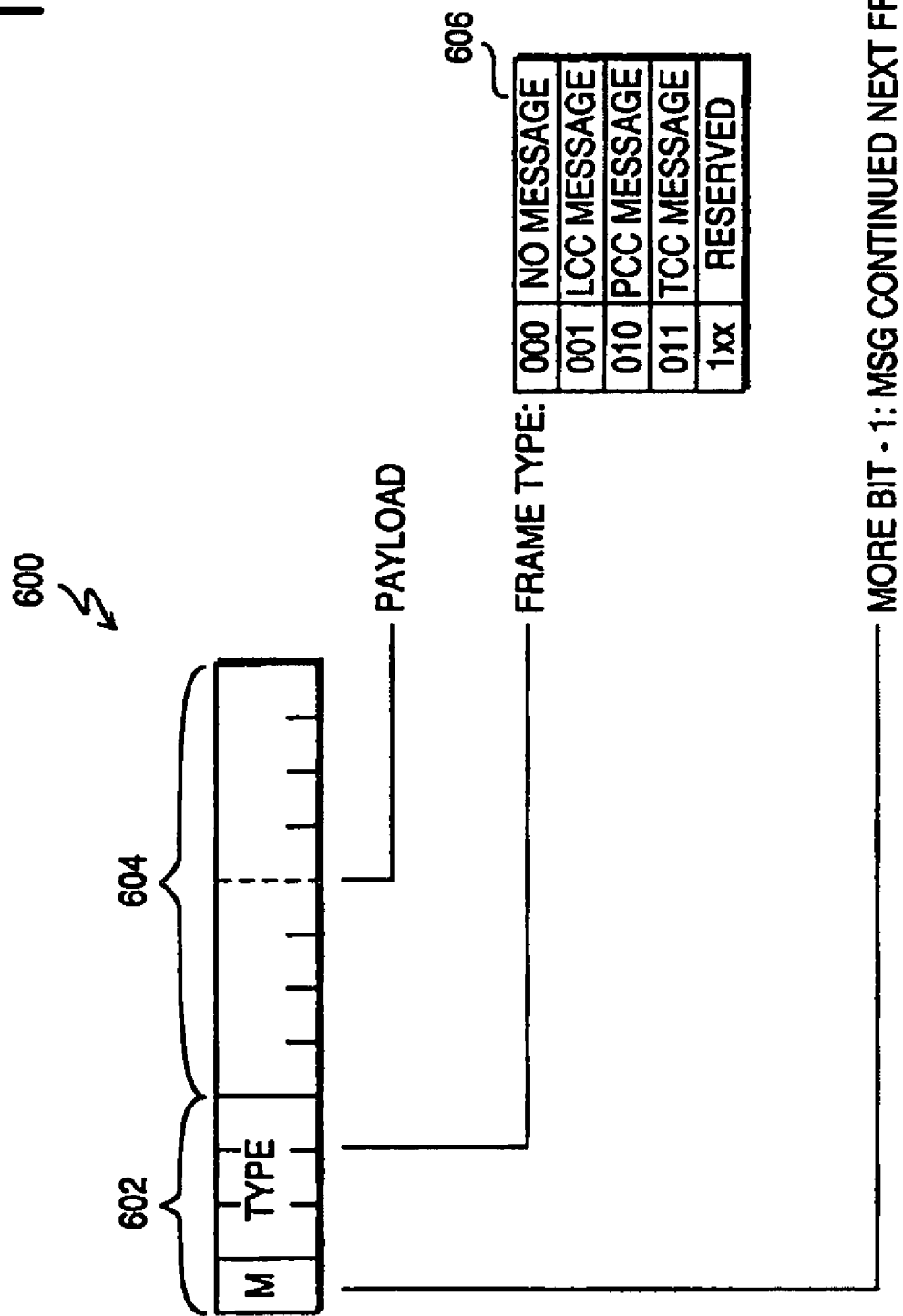
FIG. 6 is a diagram of an ACC message format in one embodiment.

FIG. 6 is a diagram of an ACC message format in one embodiment. The ACC frame 600 consists of four header bits 602, and 8 payload bits 604. The four header bits 602 include a "more bit", designated "M", and three type bits. The more bit indicates whether or not the message is complete. If the more bit is active, the ACC message continues in the next frame. The three type bits encode a frame type as shown in the frame list 606. Each ACC frame transmitted contains the four header bits 602 so that multi-frame messages can be superseded by higher priority messages. For example, this is necessary for TCC messages because the actual data for the TCC message is contained in one of the three 40-bit sub-frames of the traffic data, and cannot be held off. In one embodiment, the frame type defines four values: no message, LCC, TCC, and PCC. When there is no ACC traffic, the frame type is set to 00. While ACC data exists on the channel, the frame type corresponds to the message type (LCC, TCC, or PCC). There are four reserved message types, which may be used to implement a fast channel type message, which may use the 120 bits of payload from the ACC/traffic channel frame 500, if necessary.

The eight bits of payload are available for each ACC frame. For LCC and PCC messages, the payload is routed to or from the destination or source, respectively. The payload in a TCC message determines which of the three 40-bit frames received/transferred contain TCC messages.

As will be further explained below, the ACC messages are parsed to determine whether the message being sent is a SABM/SABMUA message. The transmission of a SABM/SABMUA indicates that the process of establishing the connection is being completed, and the next data transmitted will be telephony data that should be encrypted or decrypted. Thus, the SABM/SABMUA messages are used to synchronize encryption between a sender and receiver.

The encryption methodology of one embodiment will now be discussed. In one embodiment, RUs are provisioned with installation-based encryption keys or, alternatively, per-call encryption keys. Encryption keys for traffic channel data are 128-bit arrays of data and are derived from a message digest. A software application executing on the base station CPU handles the generation of the message digest as well as the derivation of the 128-bit traffic encryption key sequence. Generation of a message digest is based on a secure hash function, such as the Secure Hash Standard (SHS: Federal Information Processing Standard 180-1).

Figure 7:
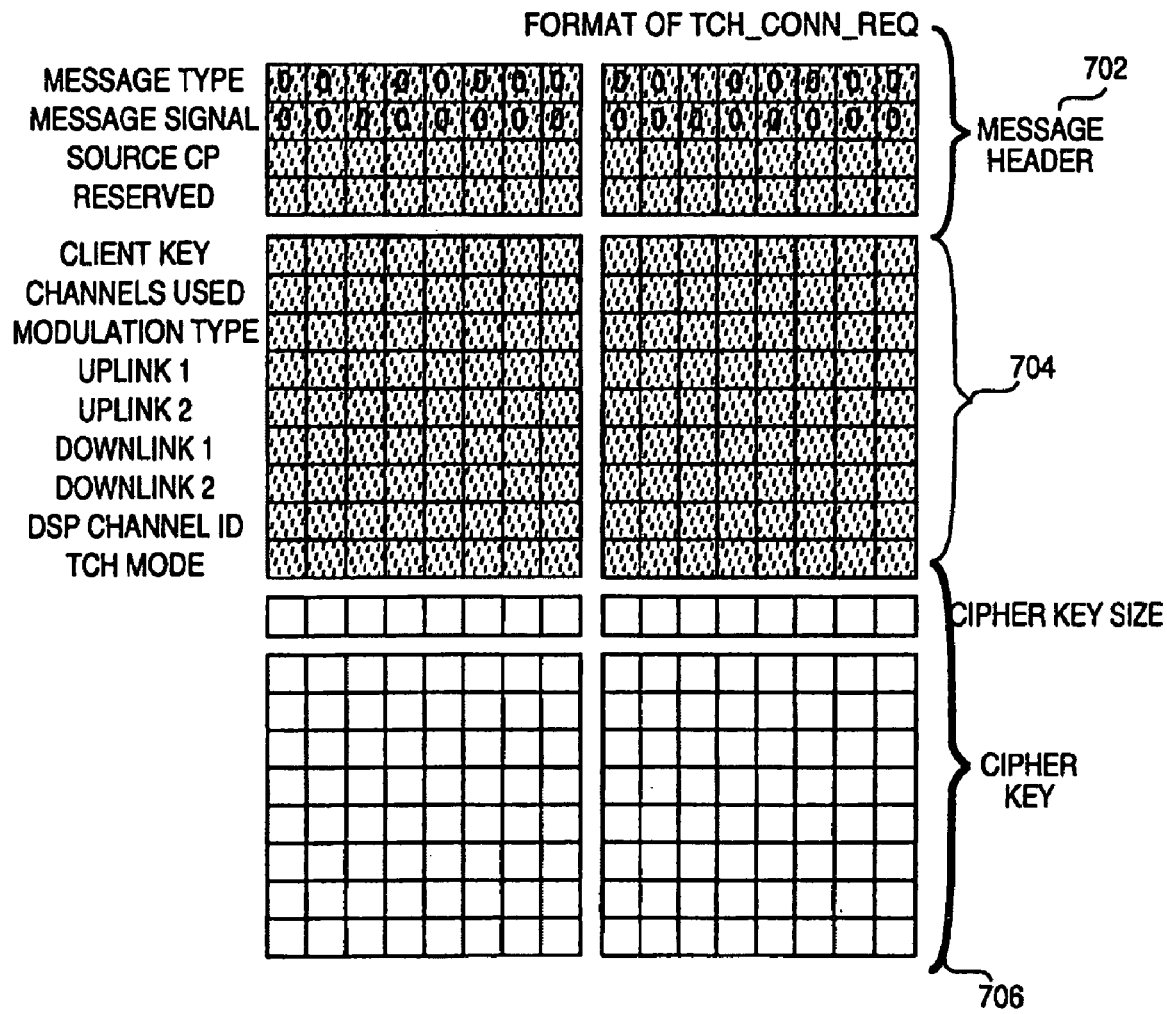
FIG. 7 is a diagram showing the format of a TCH_CONN_REQ in one embodiment.

The airlink DSP is not involved in the key-exchange and authentication process, but is involved in applying CPU-supplied encryption keys to voice traffic data. The encryption key is passed to the airlink DSP by the CPU via a traffic channel connect request (TCH_CONN_REQ) message. FIG. 7 shows a format of the TCH_CONN_REQ message, although other formats are possible. The message header 702 and message body 704 contain conventional information related to the traffic connect request. The encryption information 706 gives a current encryption state of the sender, including a current cipher, or encryption, key size and a current cipher key. The cipher key size is the size of the RC4 encryption key in bytes. In one embodiment, the airlink DSP can support unique uplink and downlink cipher keys for each channel. The TCH_CONN_REQ message can only support a single cipher key.

In one embodiment, Rivest's Cipher 4, commonly known as RC4, may be used in the cryptosystem. RC4 is a stream cipher that is relatively simple to implement, in part because the software code size is not large compared to other methods.

In addition, RC4 offers string encryption and symmetry: the same program code is useable for both encryption and decryption.

With RC4 there are some caveats on acceptable keys. Some keys have been found vulnerable to brute force attacks, and some statistical evidence was shown to this effect (See http://www.tik.ee.ethz.ch/~mwa/RC4/WeakKeys.txt).

A state box (S-box) for RC4 encryption is an array of data that is key and stream-length dependent. Stream-length dependence is an important contributor to the strength of the cryptosystem. It is not required that the stream size of the transmitter and receiver be the same. However, S-box synchronization is achieved at the beginning of the call. In one embodiment, the airlink DSP contains the encryption implementation rather than the telephony DSP because the airlink DSP has relatively greater program and data memory availability.

According to the RC4 Algorithm, an 8×N-bit encryption key is delivered to the RU as part of the traffic channel connect message. An initial state box (S-box) is generated from the N byte encryption key according to the algorithm below expressed in pseudocode.

Pseudocode for RC4 S-Box Initialization

| For indices from 0 to 255, inclusive |
|---|
| S-box [index] =     index |
| K-box [index] =     key [index mod N] |
| j-index =     0 |
| for indices from 0 to 255, inclusive |
| j-index =     (j-index + S-box[index] + K-box[index]) mod 256 |
| swap S-box[index] with S-box [j-index] |

Over time, the S-box evolves with each byte encrypted/decrypted. The run-time RC4 algorithm is:

Pseudocode for RC4 Encryption/Decryption

For each byte in the specified buffer (buf)

| i-index = | (i-index + 1) mod 256; |
|---|---|
| j-index = | (j-index + S-box[i-index] mod 256; |
| swap S-box [i-index] with S-box [j-index] mod 256; | |
| t = | (S-box [i-index] + S-box [j-index]) mod 256; |
| ciphbyte = | buf XOR S-box[t] |

The i-index and j-index are one-time initialized to 0. Their values are saved from function call to function call to ensure a slow S-box shuffle.

Given the particulars of the algorithm, this function set can provide services to any function requiring strong encryption. Good startup synchronization should be provided between the transmitter and receiver.

Private Persistent Data Structures

A data structure per duplex data stream if the RC4Key may be as follows:

```
typedef struct {
    Rc4KeyOneWay rx;
    Rc4KeyOneWay tx;
    UINT116 keySeedSize;
} Rc4Key;
```

The size of the keySeedSize may be limited to 32 bytes. Since the S-Box evolves with each byte input, a key box space is defined for each communications path (receive and transmit).

```
typedef struct {
    UINT8 S [256];
    UINT8 i;
    UINT8 j;
    UINT8 keySeed [RC4_KEY_SEED_SIZE];
} Rc4KeyOneWay;
```

In one embodiment, RC4_KEY_SEED_SIZE is defined to be 32. Although UINT8 is officially a UINT16, it serves as a reminder that quantities in the RC4 function module reference bytes. The user has flexibility to specify different key-Seeds for each direction. In one embodiment, the user is a system administrator who sets up the encryption algorithm using a specific software application. In one embodiment, the software application is a traffic application running on the airlink DSP that uses the encryption system. A simplex RC4 key box structure is defined. A simplex RC4 key box structure is inexpensive in terms of memory, and further increases the security of the links. Each encrypted, full-duplex data channel requires 583 words of data memory. All RC4 key sets are maintained by the RC4 function module.

Application Program Interface

There are five functions callable by the user: InitRC4, SetKeySize, SetKeySeed, PrepareKey, and RC4. Function prototypes for the RC4 function module are as follows:

```
void InitRC4 (void);
RC4Result SetKey Size (Rc4KeyType      keyType,
                       UINT16          keyId,
                       UINT16          keySize);
RC4Result SetKeySeed (Rc4KeyType       keyType,
                      UINT16           keyId,
                      Rc4KeyDirection  key Dir,
                      UINT16           *pKeySeed);
RC4Result PrepareKey (Rc4KeyType       keyType,
                      UINT16           keyId,
                      Rc4KeyDirection  key Dir);
RC4Result RC4 (Rc4KeyType              keyType,
               UINT16                  keyID,
               Rc4KeyDirection         keyDir,
               UINT8                   *pBuffer,
               UINT16                  bufferLen);
```

The next three subsections describe input and output data types. The subsections following the I/O data types describe the interfaces and conditions of the five user callable functions above (i.e. the RC4 function module).

RC4Result

The first data type, RC4Result, is an enumerated data type the user may exploit to determine the execution of most of the public RC4 functions. An example of a data structure for RC4Result is as follows:

```
typedef enum {
    RC4_KEY_OK,
    RC4_KEY_INVALID,
    RC4_KEY_WEAK,
    RC4_BUFFER_LENGTH_0,
    RC4_KEY_TRUNCATED,
```

-continued

```
    RC4_BAD_DIRECTION
} RC4Result;
```

An explanation of each of these results is given with the appropriate access function.

RC4KeyType

The second data type, Rc4KeyType describes the type of key to use. Under one embodiment, the only type of key used is for voice traffic, although alternative embodiments may define key types for other traffic.

```
typedef enum {
    TrafficRc4Key,
    MaxKeyTypes
} Rc4KeyType;
```

RC4KeyDirection

Because each key set is comprised of two key boxes (receive and transmit), this third enumerated data type spells out those directions explicitly.

```
typedef enum {
    Rc4Receive,
    Rc4Transmit,
    MaxRc4KeyDirections
} Rc4KeyDirection;
```

RC4INIT

The first user callable function, RC4INIT, is an initialization function that takes no inputs or outputs. It initializes all RC4 function module key sets. This function must be called before any other access functions. Additionally, it may be used only for one-time initialization since it does initialize all supported key sets. In one embodiment, two voice traffic channels are supported, although alternative embodiments may support additional voice channels, or voice channels and channels for other data.

SETKEYSIZE

With reference to Table 1, as the name suggests, the key size of a key set is set by the second user callable function, SETKEYSIZE. The key size is shared with both transmit and receive paths. The function attempts to retrieve a specified key set. If the key set is retrieved, then the function sets the keySeedSize field to the smaller of the specified keySize or RC4_KEY_SEED_SIZE.

TABLE 1

RC4Result Output of SetKeySize

| RC4Result | Interpretation |
|---|---|
| RC4_KEY_OK | All is well, the keySize was accepted for the specified keyType and keyId. |
| RC4_KEY_INVALID | The specified keyType and/or keyId is not valid. The keyType must be TrafficRc4Key. The keyId must also be appropriate: TCHA or TCHB. |
| RC4_KEY_TRUNCATED | The specified keySize was too large for the keySeed array stored in the Rc4KeyOneWay structure. There it was truncated to the maximum supported size, RC4_KEY_SEED_SIZE. |

SETKEYSEED

Figure 8:
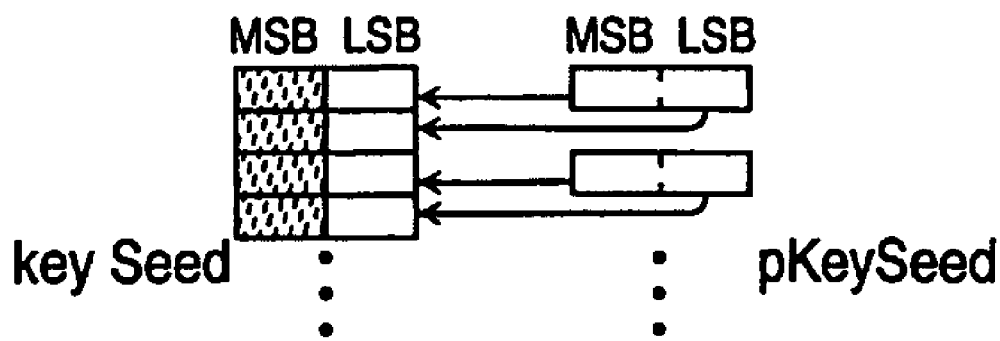
FIG. 8 is a diagram illustrating the mapping of pKeySeed to keySeed in the encryption method of an embodiment.

With reference to Table 2, this user callable function sets the keyseed array of a specified Rc4OneWay structure using the pKeySeed array as a source. So that the user need not know all the peculiarities of the RC4 function module, the pKeySeed array may be an unsigned array of 16-bit elements. For implementating this function, pKeySeed may be a packed character array. The keySeed is an array of up RC4_KEY_SEED_SIZE bytes. The pKeySeed is an array of 16-bit words. One example of the order in which the pKeySeed bytes are stuffed into the keySeed is shown in FIG. 8, "Mapping pKeySeed to keySeed". This mapping is done to facilitate S-box preparation. A small increase in complexity here, further decreases the complexity in the PrepareKey access function.

The flow of this access function is to attempt to retrieve the specified key box entry. If the function successfully retrieves the key box entry, then the pKeySeed is mapped as an array of 16-bit values to the keySeed of the key box (as shown in FIG. 8, which illustrates mapping pKeySeed to keySeed.

TABLE 2

RC4Result Output of SetKeySeed

| RC4Result | Interpretation |
| --- | --- |
| RC4_KEY_OK | The keySeed was copied to the specified key box successfully. |
| RC4_KEY_INVALID | The specified keyType, keyId, or keyDir was not valid for setting the seed. keyType must be TrafficRc4Key. keyId must be TCHA or TCHB. keyDir must be either Rc4Receive or Rc4Transmit. |

PREPAREKEY

Referring to Table 3, this function initializes a specified key box according to its keySeed. Like most of the access functions, the output is returned as an RC4Result.

TABLE 3

RC4Result Output of PrepareKey

| RC4Result | Interpretation |
| --- | --- |
| RC4_KEY_OK | Everything occurred correctly. The key box specified is ready for use. |
| RC4_KEY_INVALID | The key set specified by keyType, keyId, or keyDir is not valid. KeyType must be TCHA or TCHB. KeyDir must be either Rc4Receive or Rc4Transmit. |

PrepareKey must be called for each direction in a key set.

PrepareKey must be called for each direction in a key set.

RC4

The RC4 function is the encryption/decryption implementation of the RC4 algorithm. Given a key box and a buffer to operate upon, RC4 churns out the ciphertext or plaintext (depends on a value of the key direction "keyDir"). Note, the pBuffer has a UINT8 type specification. This means that the pBuffer must be a least-significant-byte-justified array of bytes in order to work properly. RC4 does not check to make sure the pBuffer is zero padded in the most significant bytes of the array. A keyDir of Rc4Receive will take a ciphertext pBuffer of length bufferLen, and replace the contents of pBuffer with its plaintext version. Similarly, a keyDir of Rc4Transmit will replace a plaintext pBuffer of bufferLen with its ciphertext version. Meanwhile, for valid bufferLens, the S-box is evolving with the RC4 algorithm.

Voice Encryption Software Architecture

Figure 9:
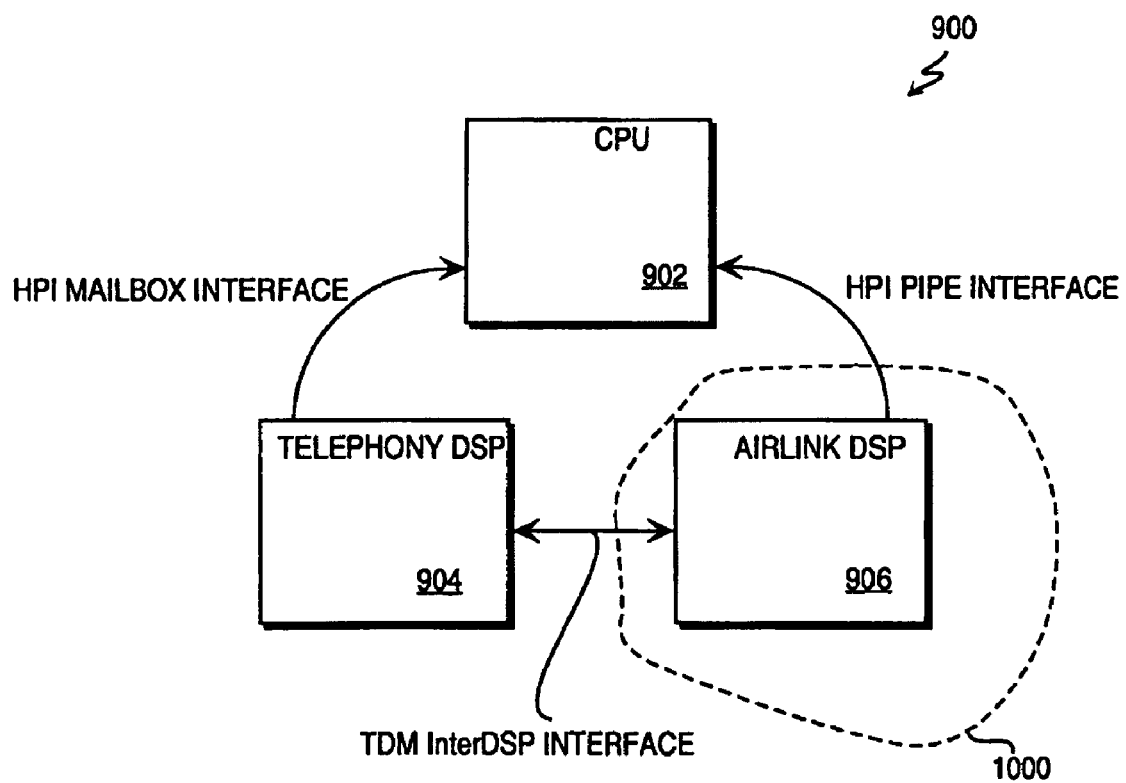
FIG. 9 is a diagram of a partial airlink DSP software architecture in a fixed wireless system ("FWS") of one embodiment.

The way in which the RC4 function module fits into the general airlink software architecture will now be discussed Basically, the ACC and control level traffic channel ("TCH") tasks handle all of the relevant RC4 interfacing. FIG. 9 is a representation of a partial airlink DSP software architecture 900 in one embodiment of a fixed wireless system ("FWS"). The architecture 900 is a generalized model of a processing core of a two-channel voice system. The details are that of the ACC and the relevant portion of the TCH tasks. The CPU 902 communicates with an airlink DSP 906 through a host port interface ("HPI") pipe interface, and with a telephony DSP 904 through an HPI mailbox interface. The DSPs 904 and 906 communicate with each other through a time division multiplex ("TDM") inter-DSP interface. Reference number 1000 indicates the airlink DSP 906 and its immediate environment in the software architecture as illustrated in further detail in FIG. 10.

Figure 10:
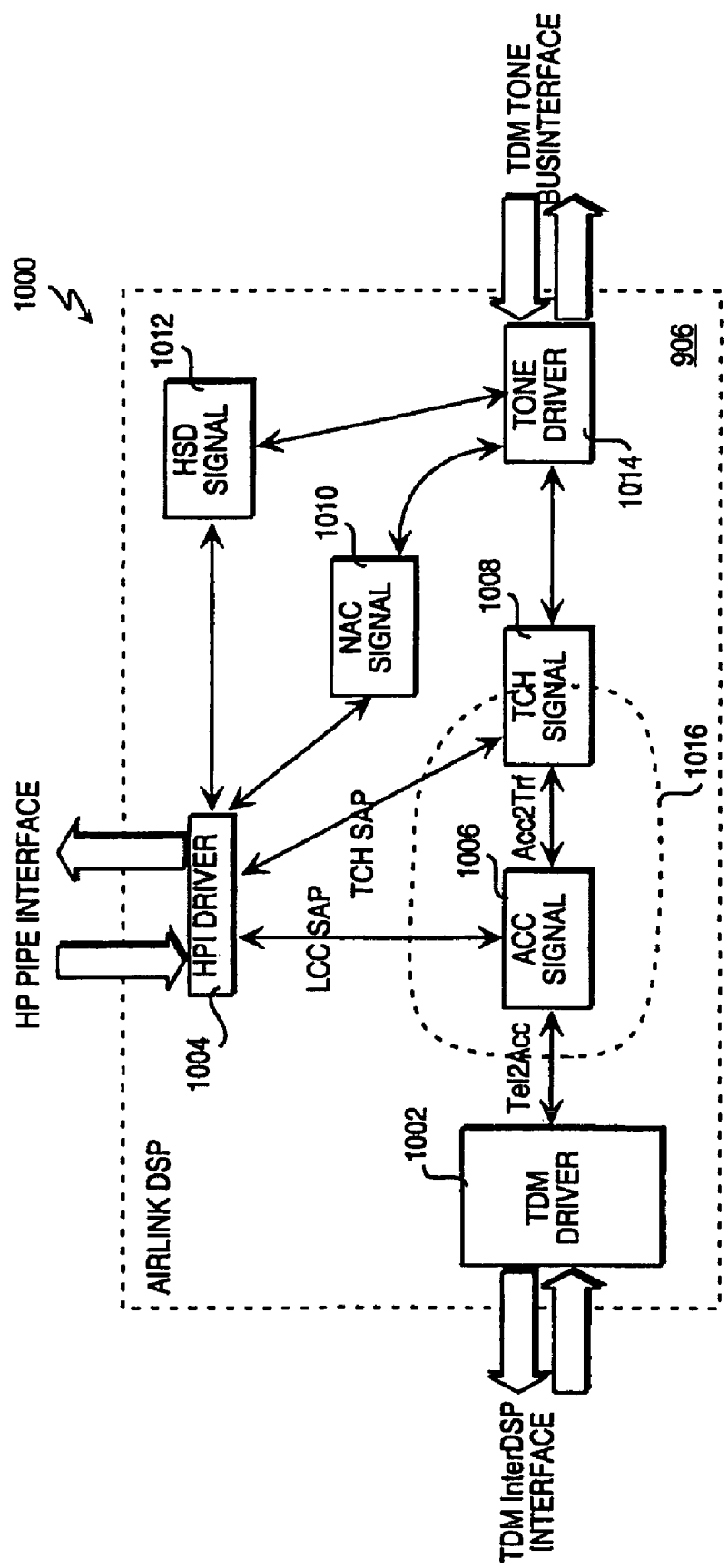
FIG. 10 is a diagram of elements of a software architecture of an airlink DSP in one embodiment.

Referring to FIG. 10, further detail of the airlink DSP 906 and it immediate environment in the software architecture 1000 of one embodiment are shown. The airlink DSP 906 includes an HPI driver 1004 through which a high-speed data ("HSD") signal 1012, a network access controller ("NAC") signal 1010, a TCH signal 1008, and an ACC signal 1006 access the HPI pipe interface. A tone driver 1014 receives tones from a TDM tone bus interface. The received tones are translated into an HSD signal 1012, a NAC signal 1010, and a TCH signal 1008. Processing the TCH signal 1008 yields the ACC signal 1006, which goes to a TDM driver 1002. Between the TCH signal 1010 and the HPI driver 1004 is a TCH service access point ("SAP"). Between the ACC signal 1006 and the HPI driver 1004 is a ACC SAP. The TDM driver 1002 communicates with a TDM inter-DSP interface. The software architecture 1016 that includes the ACC signal 1006 and the TCH signal 1008 is further illustrated in FIG. 11.

Figure 11:
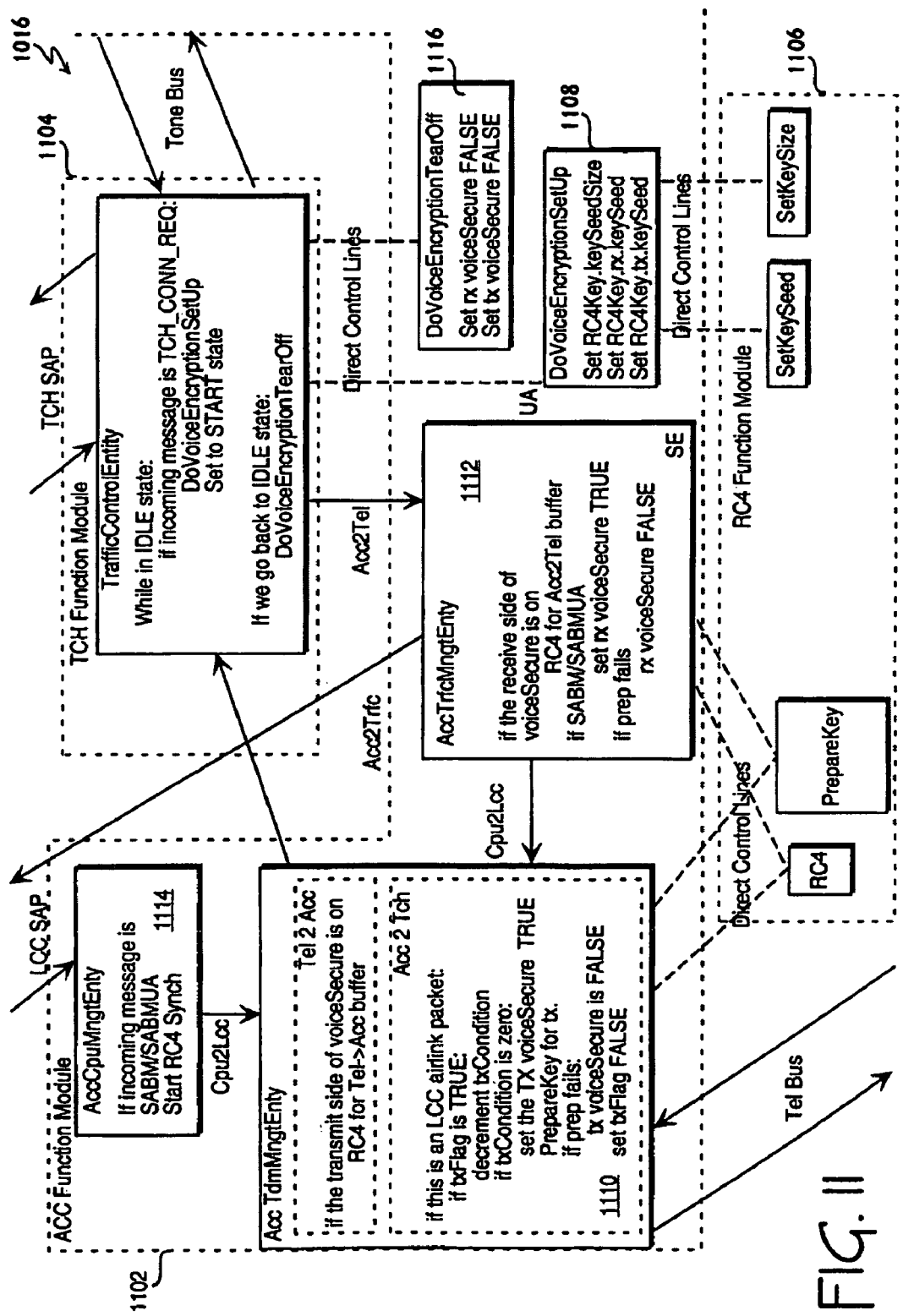
FIG. 11 is a diagram of elements of a software architecture of an RC4 software architecture within the airlink DSP in one embodiment.

FIG. 11 is a diagram of an embodiment of the software architecture 1016 that illustrates how the RC4 software module fits into the ACC and TCH signals. The software architecture 1016 includes an ACC function module 1102, a TCH SAP function module 1104, and an RC4 function module 1106. The RC4 function module 1106 includes the functions SetKeySize, SetKeySeed, PrepareKey, and RC4 described above.

The SetKeySize and SetKeySeed functions are callable by the TCH function module 1104 via direct control lines to perform voice encryption set up. The TCH function module, in the idle state, reacts to a TCH_CONN_REQ message, which requests a connection, by calling an encryption set up function 1108. The encryption set up function 1108 accesses the RC4 function module 1106 to set the encryption key size and to set the encryption key seed. When the idle state is reentered, an encryption tear off function 1116 is called, terminating the set up process.

The PrepareKey and RC4 functions are callable by an ACC TDM management entity 1110 and an ACC traffic management entity 1112 of the ACC function module 1102. As seen as pseudo code in the ACC traffic management entity 1112, if the receive side of voiceSecure is on and the SABM/SABMUA message is detected, the entity 1112 can initiate synchronization of the cryptosystem by calling the PrepareKey and RC4 functions. In one embodiment, voiceSecure is a variable that indicates whose purpose is to signify when the encryption synchronization is complete so that a next block of data to be transmitted or received will be encrypted. As shown in the ACC CPU management entity 1114, if the SABM/SABMUA message is detected in the incoming message, RC4 synchronization can be started. The ACC CPU management entity 1114 communicates with the ACC TDM management entity 1110, which checks for voiceSecure on (master encryption switch on). The ACC TDM management entity 1110 further checks for an LCC airlink packet with a transmit flag on. If the transmit flag is on, the encryption synchronization counter is decremented. If the encryption synchronization counter is zero, the ACC TDM management entity 1110 initializes the encryption synchronization by calling the PrepareKey function and the RC4 function.

RC4 Key Box Synchronization

The present state of an RC4 S-box depends on the keyseed and the length of the data stream (in bytes); an RC4 S-box can be any one of about $2^{1700}$ states. Therefore, proper synchronization is to be maintained for the duration of a data channel. The RU to base synchronization is a well-behaved software package in most existing wireless networks, so only strict synchronization on data channel startup is required.

Voice Channel Synchronization

In the illustrated embodiments, RC4 synchronization is achieved through the use of existing messaging related to connection establishment, or voice traffic setup. The RC4 function module is logically close to the ACC function module, so some known portion of its messaging may be used for RC4 synchronization. ACC communicates with the LMAC of the base station and the RU. This message SAP is peer-to-peer, meaning that it passes messages between the RU and the base station over the allocated airlink. The usefulness of this communication is clear when applied to initial synchronization of the voice security algorithms.

Because of the desire to start encryption as close to the start of the traffic channel as possible, (after examining the originating and terminating call setup flows of FIGS. 3 and 4) synchronizing each link on the SABM/SABMUA messaging is possible. Uplink is synchronized on SABM, while downlink is synchronized on SABMUA. Any call setup requires the SABM/SABMUA message transfer. This facilitates the RC4 synchronization maintenance.

By synchronizing the encryption on the SABM/SABMUA signaling, special handling of quadrature phase shift keying ("QPSK") handover can be neglected because, as far as the airlink is concerned, a new voice call is generated. The RC4 functional module is integrated with the ACC function module. Putting the encryption module as close (in a data flow sense) to the data source (the telephony DSP) as possible, simplifies the handling of encryption. Conveniently, the ACC is also responsible for passing the SABM/SABMUA messages to the CPU. This makes for clean integration with minimal external effects to be compensated for. In other embodiments, other messages that occur predictably can be used to synchronize encryption. A system architecture determines the specific protocols used for establishing a connection. Therefore, any call establishment that uses a predictable message or series of messages can use an embodiment of the invention.

Figure 12A:
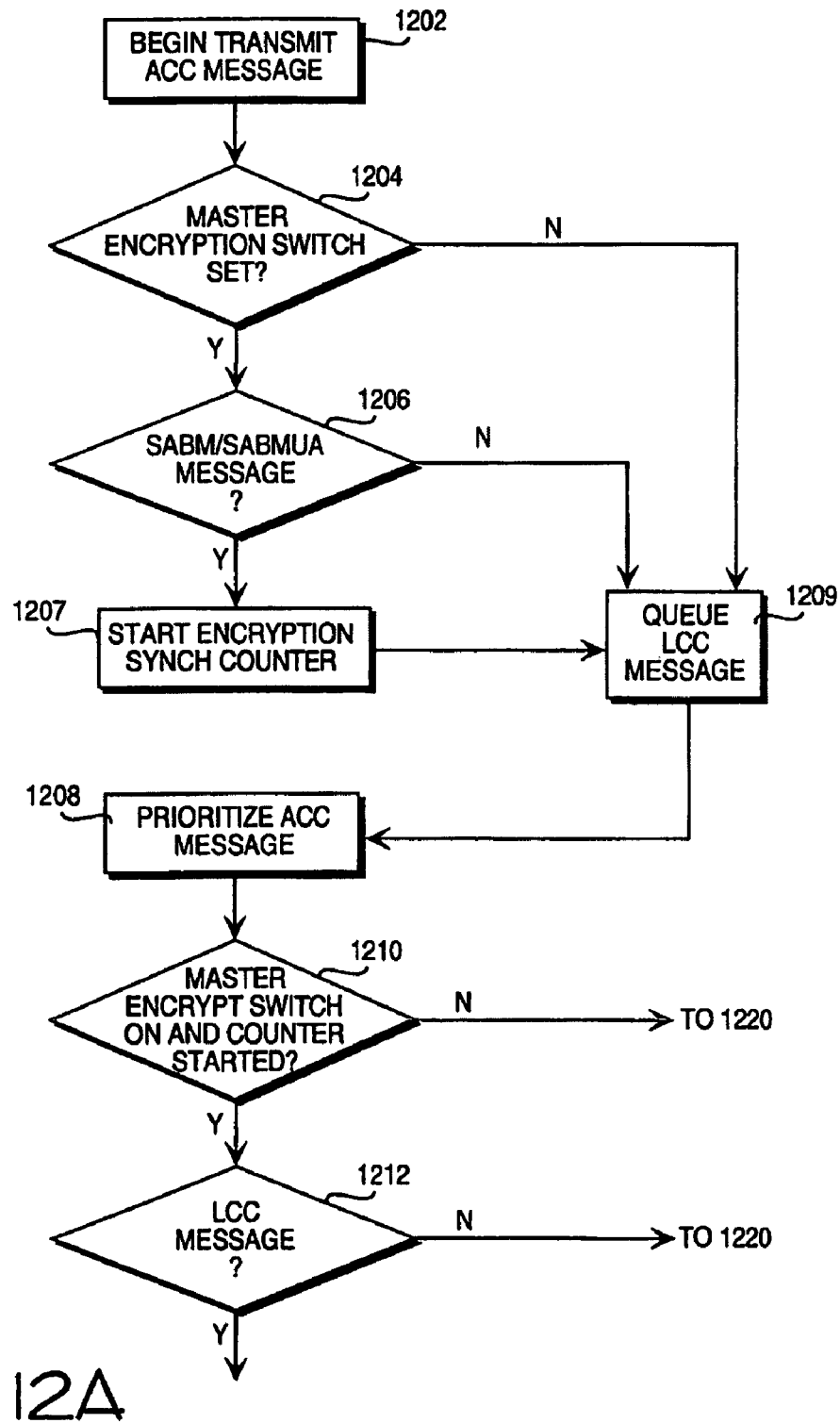
FIGS. 12A and 12B are a flow diagram of an embodiment of encryption synchronization for a terminating call.
Figure 12B:
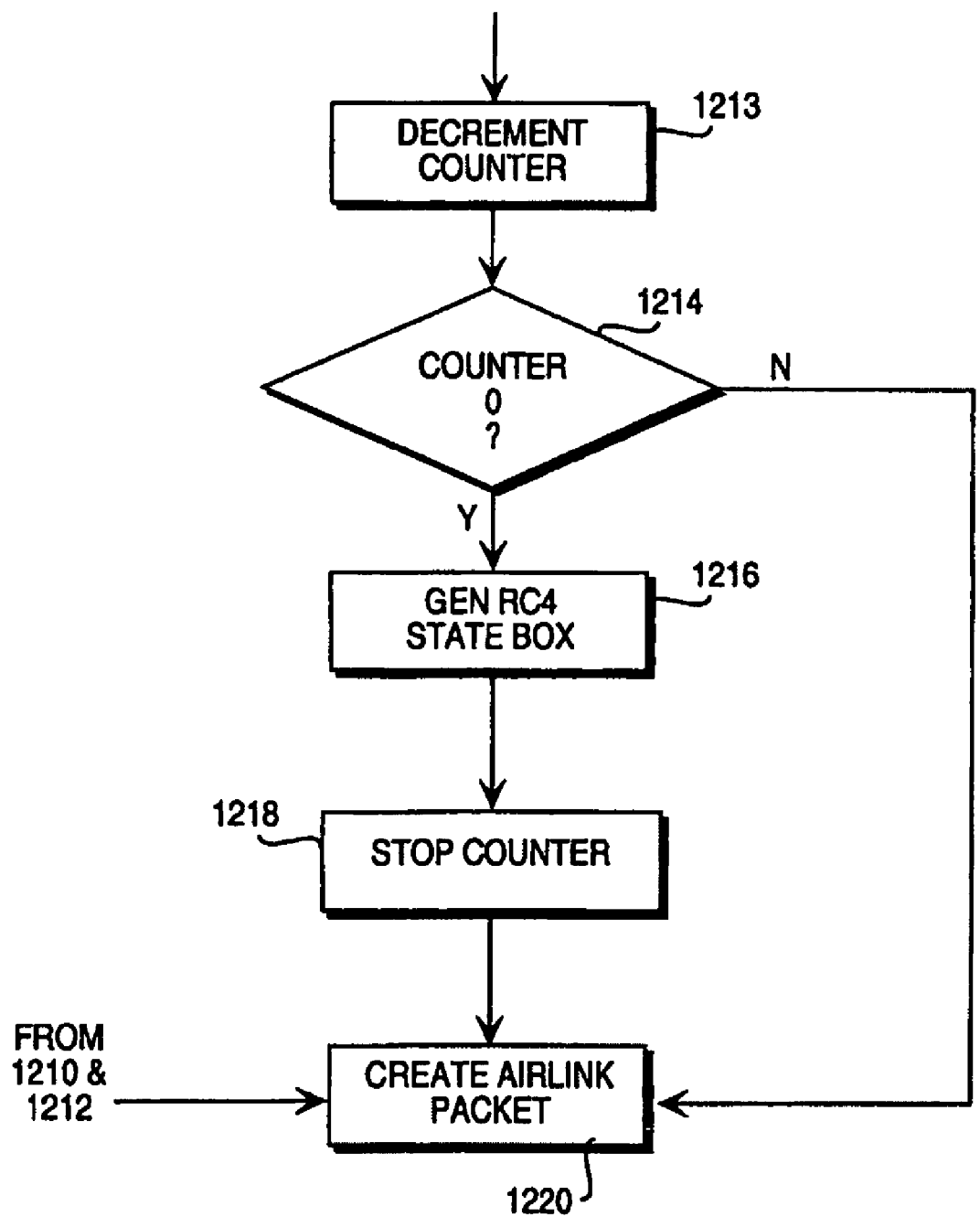

FIGS. 12A and 12B are a flow diagram of an embodiment of encryption synchronization for a terminating call, or a call in which a base station establishes a connection with an RU. At block 1202, the base station CPU begins transmitting a LCC message to an airlink DSP. In one embodiment, the instructions stored on the memory device 208 (FIG. 2) include a software program for synchronizing encryption. The software program includes a master encryption switch that indicates whether encryption is required or not. The software program further includes an encryption synchronization counter that assures that encryption/decryption is synchronized, as will be explained below.

At block 1204, it is determined whether the master encryption switch is active. The master encryption switch is set at call set up when the host directs a traffic channel to be started. In one embodiment, the DSP makes the determinations referred to. If the master encryption switch is not active, no encryption/decryption is currently required, and the LCC message is queued for traffic processing at block 1209. If the master encryption switch is active, it is then determined at block 1206 whether the message currently being sent is a SABM/SABMUA message. If the message is not a SABM/SABMUA message, the LCC message is queued for traffic processing at block 1209. The SABM/SABMUA messages occur at a recognizable point in connection establishment, and indicate when telephony data will be sent. In particular, the SABM/SABMUA message is the last message sent before the telephony data. The LCC message is not encrypted, but the telephony data is encrypted. Because data is transmitted in blocks, and because the size of the LCC message is variable, it is necessary to determine where the LCC message stops and the telephony data starts. The encryption synchronization counter is therefore loaded with the number of LCC message bytes to be transmitted, including the SABM/SABMUA message. When the encryption synchronization counter is zero, encryption/decryption can begin.

If the message is a SABM/SABMUA message, at block 1207 the number of LCC message bytes to transmit (including the size of the SABM/SABMUA message) is put into the encryption synchronization counter, and the encryption synchronization counter is started. This is the beginning of encryption synchronization. The LCC the message is queued for traffic processing at block 1209.

Traffic processing begins with block 1208. When 120 bits of telephony (payload) data have been assembled, an ACC message byte is retrieved and prioritized at block 1208. These messages have priority, as previously described, and can preempt LCC messages. At block 1210, if the master encryption switch is on and the encryption synchronization counter is started, it is determined at block 1212 whether the message is an LCC message. If the message is not an LCC message, then processing passes to block 1220, where an airlink packet is created. If the message is an LCC message, the encryption synchronization counter is decremented by one at block 1213. If the encryption synchronization counter is zero at block 1214, an RC4 state box is generated at block 1216, using a current key. If the encryption synchronization counter is not zero at block 1214, an airlink packet is created at block 1220. When the RC4 state box has been generated, encryption has been synchronized and the system can begin encrypting and decrypting data. The encryption synchronization counter is stopped at block 1218, and an airlink packet is created at block 1220.

Figure 13:
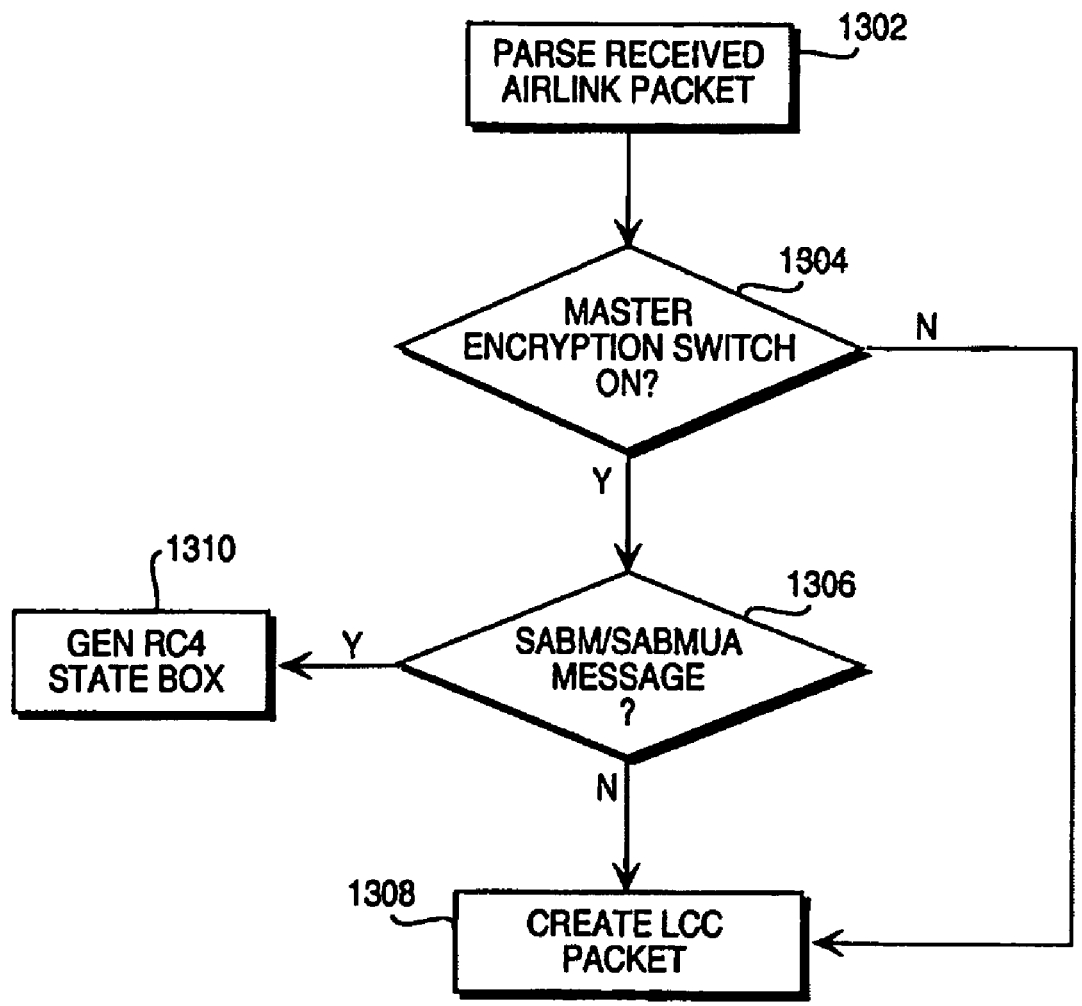
FIG. 13 is a flow diagram of an embodiment of encryption synchronization for an originating call.

FIG. 13 is a flow diagram of an embodiment of encryption synchronization for an originating call, or a call in which an RU establishes a connection with a base station. An ACC message is parsed from a received airlink packet at block 1302. As discussed with reference to FIGS. 5 and 6, and further below, 132 bits are received. 12 bits of the 132 bits are ACC bits and 120 bits are payload bits. At block 1304, if the master encryption switch is not on, an LCC packet is created to be sent to the base station CPU. If the master encryption switch is on at block 1304, it is determined whether the current message is a SABM/SABMUA message at block 1306. If the message is not a SABM/SABMUA message, an LCC packet is created to be sent to the base station CPU. If the message is a SABM/SABMUA message, an RC4 state box is generated at block 1310, and an LCC packet is created at block 1310.

At this point, the synchronization should be with a "new" RC4 key. If an "old" RC4 key is used, the system could be attacked. In one embodiment, an additional algorithm is used to generate a new RC4 key. Both the RU and the base station know the algorithm, and may use it to generate a new key. The SABM/SABMUA message synchronize the new RC4 state boxes, and transmission continues. RC4 key generation will be discussed in more detail below.

Figure 14:
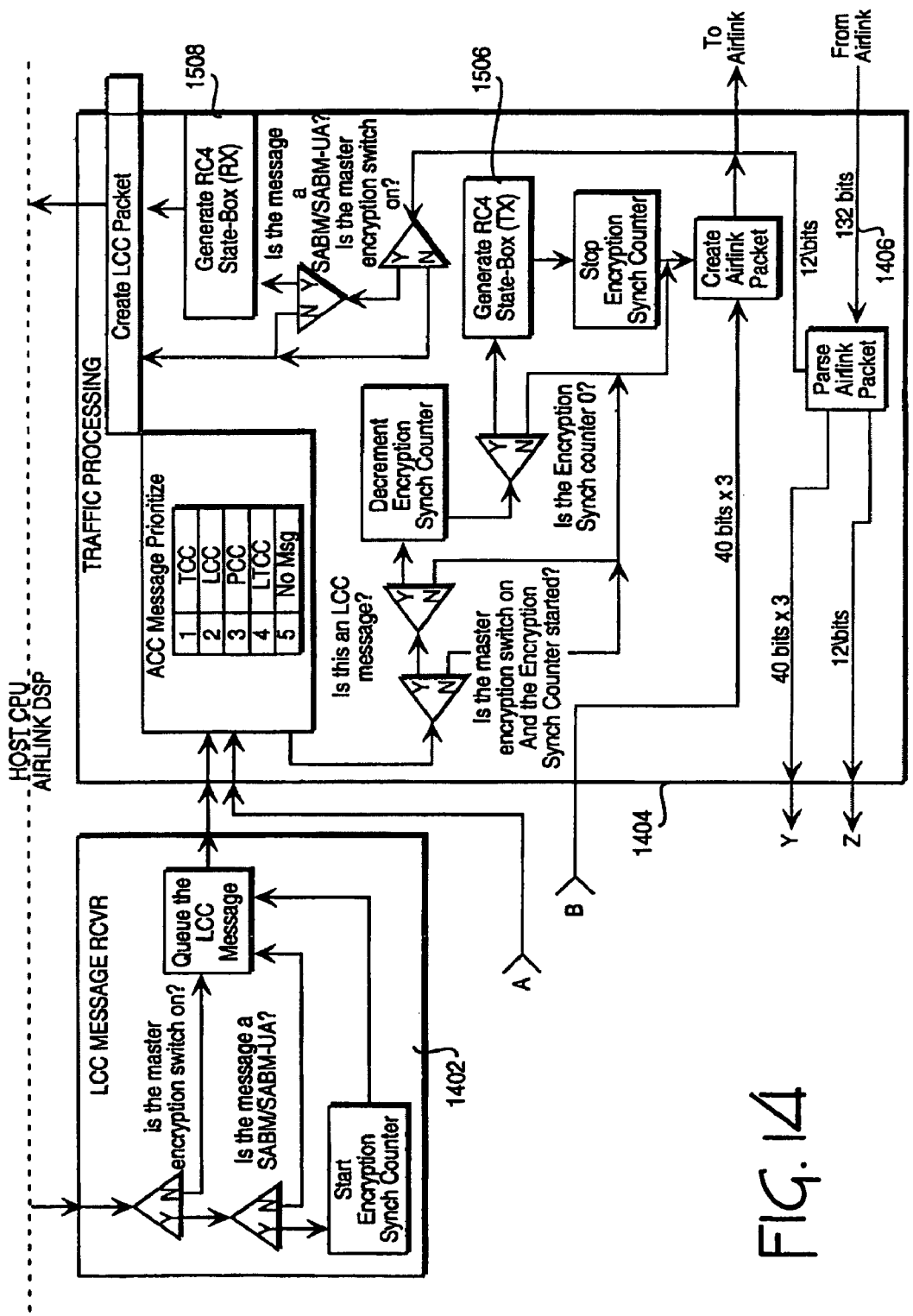
FIGS. 14 and 15 are block diagrams that further illustrate embodiments of encryption synchronization.
Figure 15:
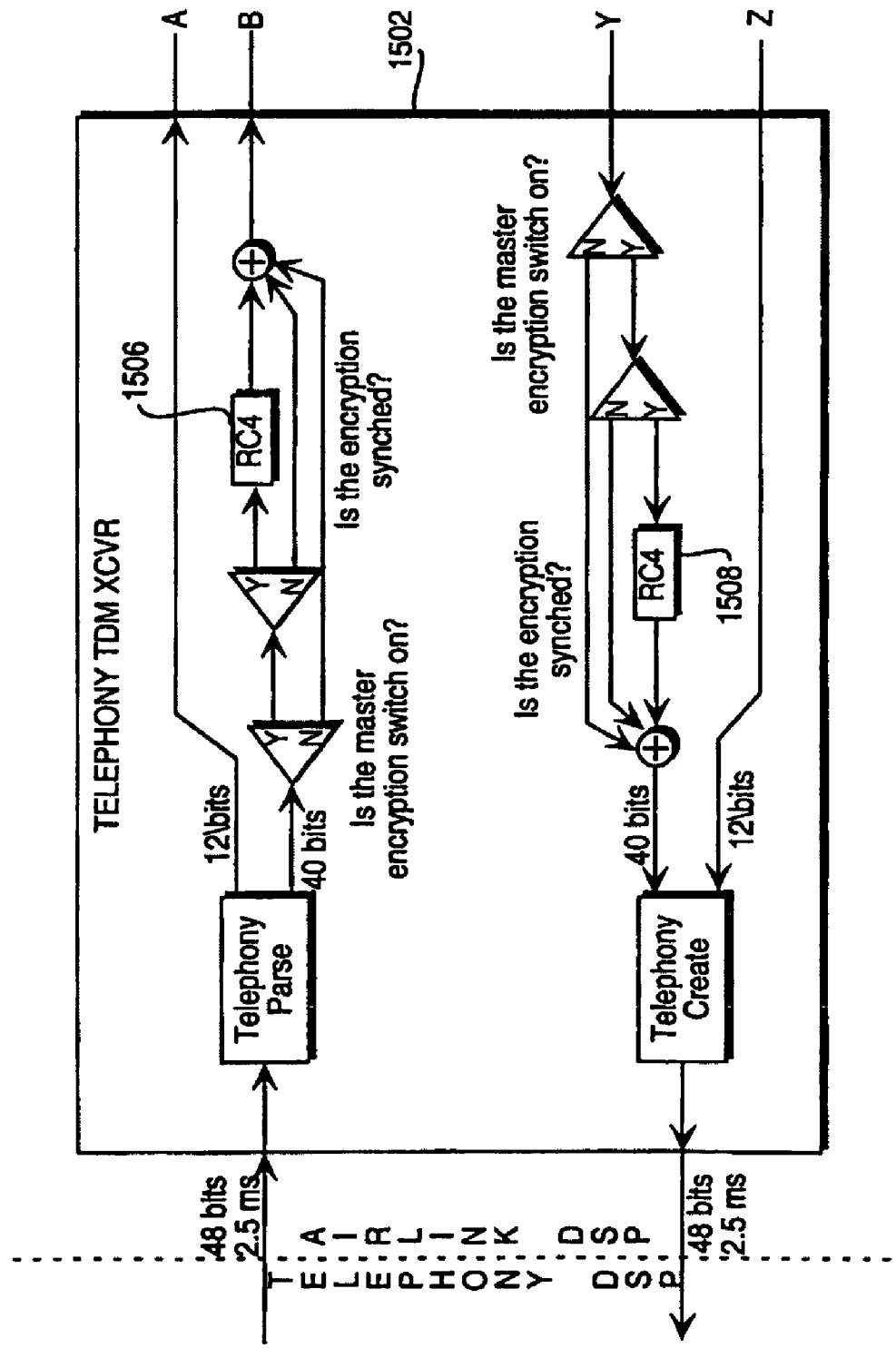

FIGS. 14 and 15 are block diagrams that further illustrate embodiments of encryption synchronization. In one embodiment, FIGS. 14 and 15 are a block diagram of the ACC function with respect to encryption synchronization. FIGS. 14 and 15 group the function into 3 sections: section 1402 is LCC message receipt from the CPU by the airlink DSP; section 1404 is traffic processing by the airlink DSP; and section 1502 is generation of the RC4 state box by a telephony TDM transceiver. The arrangement of functions and entities in the figures is exemplary, and other arrangements of functions and entities are contemplated within the scope of the invention.

Referring to FIG. 14, LCC message receipt function 1402 and traffic processing function 1404 are shown in the airlink DSP. In the transmit direction, an LCC message is received from the CPU. If the master encryption switch is on and the LCC message is a SABM/SABMUA message, then the number of LCC message bytes to transmit is counted, including the size of the SABM/SABMUA message, and loaded into the encryption synchronization counter. This begins the encryption synchronization process.

Referring to traffic processing function 1404, when 120 bits of telephony data have been assembled, an ACC message byte is retrieved. ACC message bytes have priority as previously discussed. Only TCC messages can preempt LCC messages.

If the master encryption switch is on and the encryption synchronization counter was started, then the encryption synchronization counter is decremented by one. If the encryption synchronization counter is zero, then a transmit RC4 state box is generated at block 1506, and the encryption is considered synched. The encryption synchronization counter is stopped, and an airlink packet is created.

In the other direction of transmission, upon receipt of a 132 bit airlink packet 1406 from the airlink, the ACC is parsed from the packet.

If the master encryption switch is on and the ACC contains a SABM/SABMUA LCC message, then a receive state box is generated at block 1508, and the receive cryptosystem is considered synchronized. An LCC packet is created for transmission to the CPU.

At this point, the resynchronization may use a "new" RC4 key. Not to do so could open the system to attack. Therefore, an additional algorithm is used to generate a resend key. In one embodiment, a switch-tail shift register is used to generate a new key. Both the RU and the base station know this algorithm, and use it to generate a new key. New key generation is discussed more fully below, but first state box generation will be discussed with reference to FIGS. 14 and 15.

FIG. 15 is a block diagram showing aspects of a state box generation function 1502 that performs state box generation in a telephony TDM transceiver on the airlink DSP. A generate RC4 function 1506 generates the transmit state box, while a generate RC4 function 1508 generates the receive state box. On the receive end, an airlink packet 1406 is received from the telephony DSP and parsed to separate 12 ACC bits "Z" from the 40 payload bits "Y" (the 120 payload bits are sent in three blocks of 40 payload bits each). If the master encryption switch is active and encryption is synched (this means that the encryption synchronization counter is zero), the RC4 state box is generated at block 1508 according to the method described above. The payload data is encrypted by exclusive-ORing it with the state box data as previously described, and the result, "B", is used to create an airlink packet. If the master encryption switch is not active or the encryption is not synched, the payload data is not encrypted.

On the transmit end, telephony data from the base station is parsed. The 12 bits of ACC data "A" are sent to traffic processing 1404. If the master encryption switch is active and the encryption is synched, then the RD4 state box is generated, and the payload data is encrypted as previously described. If the If the master encryption switch is not active or the encryption is not synched, the payload data is not encrypted.

Figure 16:
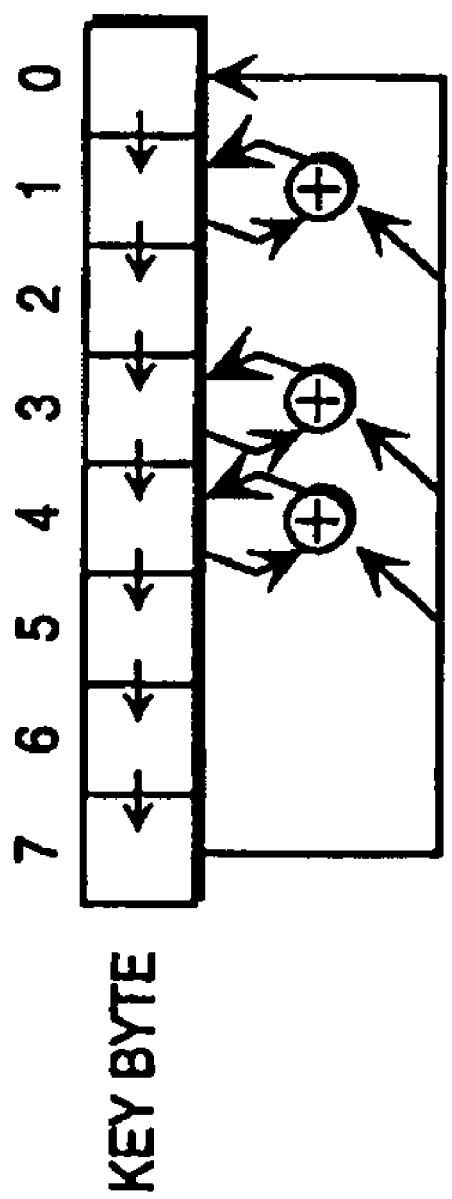
FIG. 16 is a diagram of one byte of an encryption key string, illustrating key generation according to an embodiment.
Figure 17:
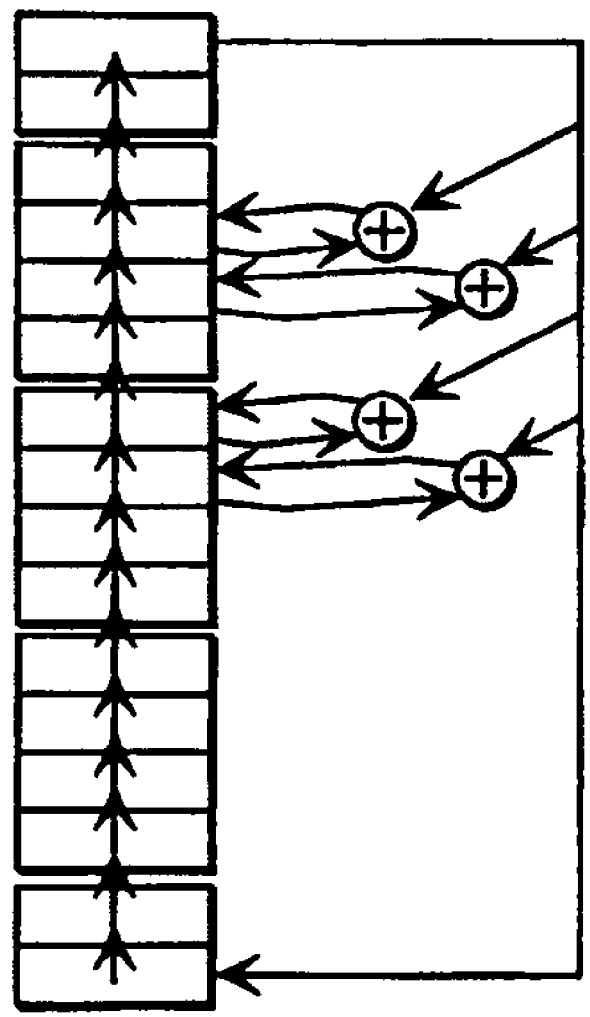
FIG. 17 is a diagram of an encryption key string, further illustrating key generation according to an embodiment.

FIGS. 16 and 17 illustrated an embodiment of RC4 key generation that occurs on encryption resynchronization. The process uses a Mobius strip function to generate new key bytes in each place of the key string. In one embodiment, the specific polynomial used on each byte of the key is $x^7+x^4+x^3+x+1$. This is shown in FIG. 16, which is a diagram of one byte of the key string with the bits labeled 0 through 7. Using the first bit, each bit corresponding to the polynomial is exclusive-ORed with the first bit. Then, each bit is shifted up in the array. The exclusive-OR operations occur before the shifting operations.

To further obfuscate the key, the same process is applied to the whole key. The key is shown in FIG. 17. The key includes 16 bytes, with byte 0 shown at the top of the diagram. Using the first key byte, each byte corresponding to the polynomial is exclusive-ORed with the first key byte (byte 0). After which, each key byte is shifted up in the array. The exclusive-OR operations occur before the shifting operations.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above", "below," and words of similar import, when used in this application, shall refer to this application as a whole and not to any particular portions of this application.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the wireless communication system described herein. The various embodiments described herein can be combined to provide further embodiments. These and other changes can be made to the invention in light of the detailed description.

Any references and U.S. patents and applications listed above are incorporated herein by reference. Aspects of the invention can be modified, if necessary, to employ the systems, functions and concepts of any patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A non-transitory computer-readable medium comprising computer-executable instructions for synchronizing a cryptosystem between a sender and a receiver in a wireless network comprising at least one base station and at least one remote unit, the medium comprising instructions for:
   detecting a particular control message at an associated control channel level that is sent each time an airlink channel is set up;
   in response to detecting the particular control message, determining a point in the transmission at which to begin operating the cryptosystem, including changing an encryption key that is used by the base station and the remote unit;
   loading an encryption synchronization counter with a size of an associated control channel message that contains the particular control message, wherein the associated control channel message is transmitted in blocks; decrementing the encryption synchronization counter to zero when a last block of the associated control channel message has been transmitted; and
   when the particular control message has been detected and the encryption synchronization counter is zero, initializing the cryptosystem.

2. The non-transitory computer-readable medium of claim 1, wherein the particular control message is a final control message sent before payload data is sent.

3. The non-transitory computer-readable medium of claim 1, further comprising instructions for using the changed encryption key to generate a state box that is used by the base station and the remote unit to perform encryption and decryption.

4. The non-transitory computer-readable medium of claim 1, wherein the operation of the cryptosystem occurs at the associated control channel level.

5. The non-transitory computer-readable medium of claim 1, further comprising instructions for:
   receiving an encryption key via a traffic channel request message; and
   generating a state box using the encryption key.

6. The non-transitory computer-readable medium of claim 1, wherein the particular control message is either a "set asynchronous balance mode" message or a "set asynchronous balance mode unnumbered acknowledge" message.

7. The non-transitory computer-readable medium of claim 1, wherein the cryptosystem includes an RC4 state box that is generated by the encryption key.

8. A wireless communication system, comprising:
   at least one remote unit comprising,
      at least one digital signal processor;
      a central processing unit; and
      a memory device, wherein the at least one remote unit is configured to receive data from and send data to at least one base station; and
   at least one base station comprising:
      at least one digital signal processor;
      a central processing unit; and
      a memory device, wherein the at least one base station is configured to:
         detect a particular control message in a data transmission,
         determine a point in the data transmission at which to begin operating the cryptosystem,
         load an encryption synchronization counter with a size of an associated control channel message that contains the particular control message, wherein the associated control channel message is transmitted in blocks;
         decrement the encryption synchronization counter to zero when the last block of the associated control channel message has been transmitted; and
         when the particular control message has been detected and the encryption synchronization counter is zero, initiate an encryption/decryption process.

9. The system of claim 8, wherein initiating the encryption decryption process includes the base station transmitting an encryption key via a traffic channel request message, and wherein the encryption key is used by the remote unit and the base station to generate a state box.

10. The system of claim 8, wherein the at least one digital signal processor of the base station comprises an airlink digital signal processor including a memory that contains a software architecture, the software architecture comprising:
    an associated control channel function module; and
    a traffic channel function module, wherein initiating the encryption/decryption process includes the associated control channel function module and the traffic channel function module accessing an encryption/decryption function module to prepare an encryption key and begin the encryption/decryption process using an encryption/decryption algorithm.

11. The system of claim 10, wherein the encryption/decryption algorithm is an RC4 algorithm.

12. The system of claim 8, wherein the particular control message is selected from a group comprising a "set asynchronous balance mode" message and a "set asynchronous balance mode unnumbered acknowledge" message.

13. The system of claim 8, wherein the particular control message is a final control message sent before payload data is sent.

14. A method for synchronizing a cryptosystem between a sender and a receiver in a wireless network comprising at least one base station and at least one remote unit, the method comprising:
    detecting a particular control message at an associated control channel level that is sent each time an airlink channel is set up;
    in response to detecting the particular control message, determining a point in the transmission at which to begin operating the cryptosystem, including changing an encryption key that is used by the base station and the remote unit;
    loading an encryption synchronization counter with a size of an associated control channel message that contains the particular control message, wherein the associated control channel message is transmitted in blocks;

decrementing the encryption synchronization counter to zero when a last block of the associated control channel message has been transmitted; and when the particular control message has been detected and the encryption synchronization counter is zero, initializing the cryptosystem.

15. The method of claim 14, wherein the particular control message is a final control message sent before payload data is sent.

16. The method of claim 14, further comprising using the changed encryption key to generate a state box that is used by the base station and the remote unit to perform encryption and decryption.

17. The method of claim 14, wherein the operation of the cryptosystem occurs at the associated control channel level.

18. The method of claim 14, wherein the cryptosystem includes an RC4 state box that is generated by the encryption key.

19. The method of claim 14, further comprising determining that a master encryption switch is active.

20. The method of claim 14, wherein the particular control message is one of a "set asynchronous balance mode" message and a "set asynchronous balance mode unnumbered acknowledge" message.

* * * * *